United States Patent
Chiba et al.

(10) Patent No.: US 9,177,276 B2
(45) Date of Patent: Nov. 3, 2015

(54) DATA ASSOCIATION PROCESS, DATA ASSOCIATION METHOD, AND DATA ASSOCIATION APPARATUS

(71) Applicants: FUJITSU LIMITED, Kawasaki-shi (JP); HONDA MOTOR CO., LTD., Tokyo (JP)

(72) Inventors: Takashi Chiba, Suginami (JP); Shota Yamada, Kawasaki (JP); Yasuo Kurosaki, Wako (JP)

(73) Assignees: FUJITSU LIMITED, Kawasaki (JP); HONDA MOTOR CO., LTD., Tokyo (JP)

( * ) Notice: Subject to any disclaimer, the term of this patent is extended or adjusted under 35 U.S.C. 154(b) by 366 days.

(21) Appl. No.: 13/660,361

(22) Filed: Oct. 25, 2012

(65) Prior Publication Data

US 2013/0111157 A1     May 2, 2013

(30) Foreign Application Priority Data

Oct. 31, 2011   (JP) .................. 2011-239735

(51) Int. Cl.
*G06F 12/00* (2006.01)
*G06Q 10/06* (2012.01)
(52) U.S. Cl.
CPC .................. *G06Q 10/06313* (2013.01)
(58) Field of Classification Search
CPC .................. G06F 12/08; G06F 11/1456
USPC .................. 711/159, 162
See application file for complete search history.

(56) References Cited

U.S. PATENT DOCUMENTS

| | | | | |
|---|---|---|---|---|
| 2005/0223186 A1* | 10/2005 | Belevich et al. | ............... | 711/202 |
| 2008/0155524 A1* | 6/2008 | Shone et al. | ................... | 717/168 |
| 2011/0047347 A1* | 2/2011 | Li et al. | .......................... | 711/209 |

FOREIGN PATENT DOCUMENTS

| | | |
|---|---|---|
| JP | 8-147152 | 6/1996 |
| JP | 2004-252719 | 9/2004 |
| JP | 2007-122135 | 5/2007 |

OTHER PUBLICATIONS

Japanese Office Action mailed Jan. 28, 2014 in corresponding Japanese Application No. 2011-239735.

* cited by examiner

*Primary Examiner* — Gurtej Bansal
(74) *Attorney, Agent, or Firm* — Staas & Haley LLP

(57) ABSTRACT

A computer-readable recording medium stores a program causing a computer to execute an association process that includes identifying a second storage location associated with a first storage location by referring to a memory unit configured to store storage location association information indicating relevance between the first storage location and the second storage location where data prepared at a second operation stage associated with a first operation stage is stored. The second storage location is identified when new data is stored to the first storage location where data prepared at the first operation stage among multiple stages for manufacture of a product is stored. The association process further includes creating and recording in the memory unit, data association information indicating the relevance between the new data stored in the first storage location and the latest data among the data that is stored in the second storage location.

9 Claims, 19 Drawing Sheets

FIG.4

WP LIST TABLE — 220

| WPBOXID | WP NAME | REVISION | APPROVAL FLAG |
|---|---|---|---|
| 400-1 — WPBOX1 | A_1.1.txt | 1.1 | 0 |
| | A_1.2.txt | 1.2 | 0 |
| | A_1.3.txt | 1.3 | 0 |
| | A_1.4.txt | 1.4 | 1 |
| 400-2 — WPBOX2 | B_1.0.xls | 1.0 | 0 |
| | B_1.1.xls | 1.1 | 0 |
| | ⋮ | ⋮ | ⋮ |
| ⋮ | ⋮ | ⋮ | ⋮ |

FIG.5

WPBOX RELATION TABLE — 110

| WPBOX RELATION ID | WPBOXID (PARENT) | WPBOXID (CHILD) | LOGICAL DELETION FLAG |
|---|---|---|---|
| | | | |

WP CREATION

WP CREATION

WPBOX RELATION SETTING

WP RELATION SETTING

WP CREATION

FIG.12C
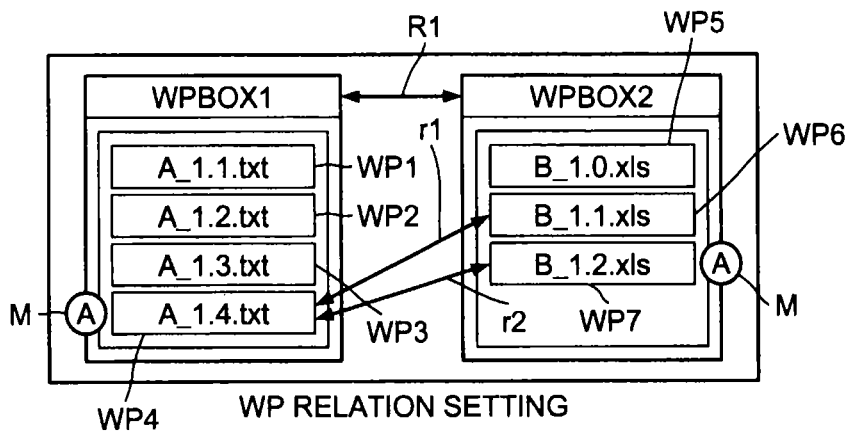
FIG.13A
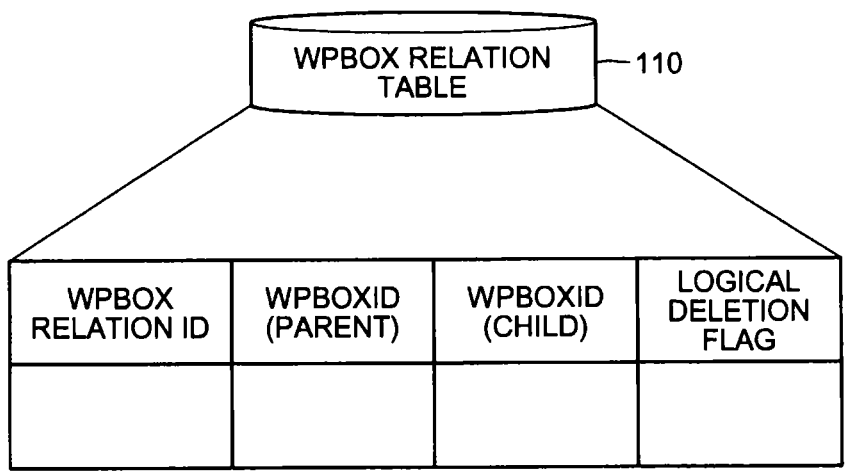
FIG.13B
| WPBOX RELATION ID | WPBOXID (PARENT) | WPBOXID (CHILD) | LOGICAL DELETION FLAG | |
|---|---|---|---|---|
| R1 | WPBOX1 | WPBOX2 | 0 | 1300-1 |

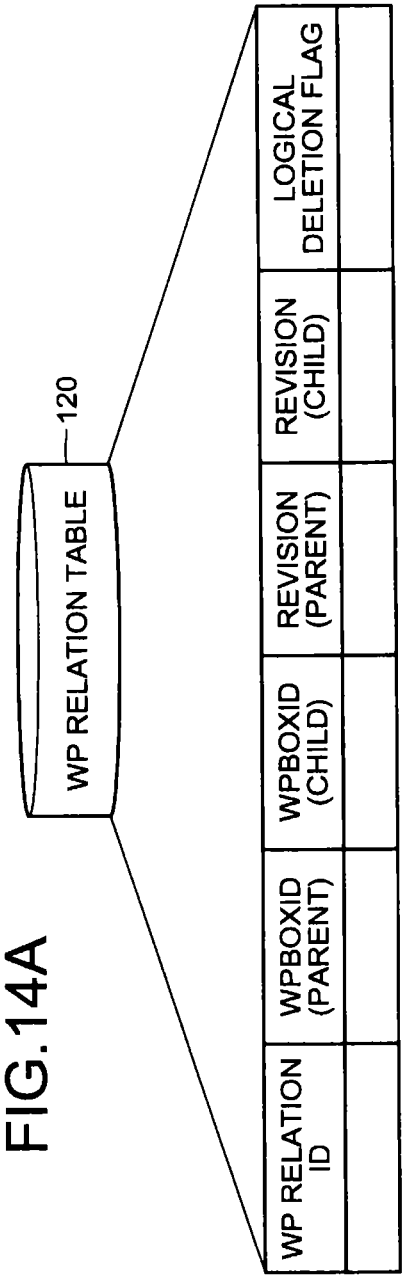

WP CREATION

WPBOX RELATION SETTING

WP CREATION

WP RELATION SETTING

FIG.16A

WP RELATION TABLE —120

| WP RELATION ID | WPBOXID (PARENT) | WPBOXID (CHILD) | REVISION (PARENT) | REVISION (CHILD) | LOGICAL DELETION FLAG |
|---|---|---|---|---|---|
| | | | | | |

FIG.16B 1600-1

| WP RELATION ID | WPBOXID (PARENT) | WPBOXID (CHILD) | REVISION (PARENT) | REVISION (CHILD) | LOGICAL DELETION FLAG |
|---|---|---|---|---|---|
| r1 | WPBOX1 | WPBOX2 | 1.0 | 1.0 | 0 |

DATA ASSOCIATION PROCESS, DATA ASSOCIATION METHOD, AND DATA ASSOCIATION APPARATUS

CROSS REFERENCE TO RELATED APPLICATIONS

This application is based upon and claims the benefit of priority of the prior Japanese Patent Application No. 2011-239735, filed on Oct. 31, 2011, the entire contents of which are incorporated herein by reference.

FIELD

The embodiment discussed herein is related to an association method and an association apparatus.

BACKGROUND

In the development of a product for mass production, when the product in the design stage passes through various types of testing and enters the mass production system, the drawings and materials related to the product are fixed as a work product (WP) in relation to the product under mass production, that is to say, in relation to the current product. A base line is set for the fixed WP, and when revising a WP that has a set base line, management is performed in relation to the details of any change, the reason for the change, the party approving the change, and the relevant dates for the change, and the like.

Furthermore, when some kind of change in the specification of a product under mass production is required consequent to, for example, a recall and the WP is revised, whether other components are affected by the change of the specification is investigated. Therefore, it is important to maintain information that identifies other WPs that are associated with a given WP in a system.

Related prior art includes proposals to improve the reliability of a specification and improve production characteristics in the production operations for a specification for new software using previously prepared software specifications (for example, refer to Japanese Laid-Open Patent Publication No. H8-147152). Furthermore, there is a technique of supporting the development of request description documents describing the software requests, the design model prepared on the basis of the requests description documents, and the deliverables which are the program codes prepared from the design model (for example, refer to Japanese Laid-Open Patent Publication No. 2007-122135).

However, the prior art techniques have a problem in that, when a new WP is prepared, the operation load is increased in relation to operations for association of WPs since the association of the new WP to another WP that is associated with the new WP has been performed manually.

SUMMARY

According to an aspect of an embodiment, a computer-readable recording medium stores a program causing a computer to execute an association process that includes identifying a second storage location associated with a first storage location by referring to a memory unit configured to store storage location association information indicating relevance between the first storage location and the second storage location where data prepared at a second operation stage associated with a first operation stage is stored. The second storage location is identified when new data is stored to the first storage location where data prepared at the first operation stage among multiple stages for manufacture of a product is stored. The association process further includes creating and recording in the memory unit, data association information indicating the relevance between the new data stored in the first storage location and the latest data among the data that is stored in the second storage location.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 depicts an example of details of the contents of a WP list table 220;

FIG. 5 depicts a data structure example of a WPBOX relation table 110;

FIGS. 11A, 11B, 11C, 12A, 12B, and 12C depict a first example of setting of relations between WPBOXs and between WPs;

FIGS. 13A and 13B depict an example of transition of the contents in the WPBOX relation table 110;

FIGS. 14A, 14B, and 14C are diagrams depicting an example of transition of the contents in the WP relation table 120;

FIGS. 16A and 16B are diagrams depicting an example of the transition of the contents in the WP relation table 120;

DESCRIPTION OF EMBODIMENTS

Preferred embodiments of the present invention will be explained with reference to the accompanying drawings.

Figure 1:
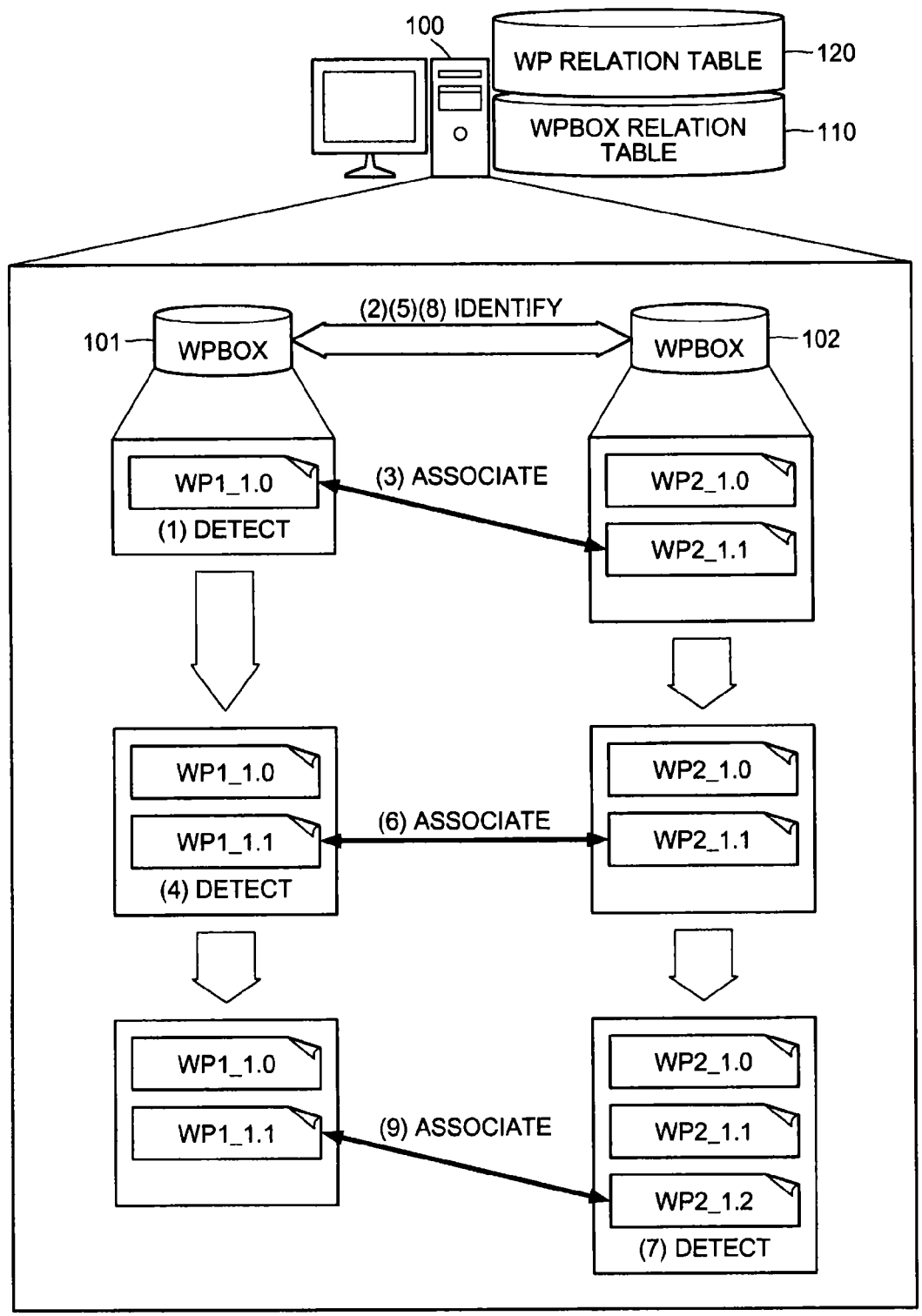
FIG. 1 depicts an example of an association method according to an embodiment.

FIG. 1 depicts an example of an association method according to an embodiment. In FIG. 1, an association apparatus 100 is a computer configured to perform an association between data. The association apparatus 100 includes a WPBOX relation table 110 and a WP relation table 120.

As used herein, the WPBOX (work product BOX) 101 is a storage location for the WP prepared at a first operation stage. The WPBOX 102 is a storage location for the WP prepared at a second operation stage. For example, the WPBOX 101 and 102 are memory spaces of folders or directories, where the WP prepared at each operation stage is stored.

An operation stage means, for example, any operation stage related to design and manufacture of a development object. An automobile is an example of a product that is a development object. Specific examples of an operation stage include, for example, a project planning stage in the development of an automobile, a requirements definition stage, a specification definition stage, a system design stage, a hardware/software design stage, a hardware/software manufacturing stage, a hardware/software verification stage, and a safety verification stage for the overall automobile, and the like.

A WP is data that expresses the deliverables of the operations performed at each operation stage, and for example, is electronic data of documents, figures or tables. Examples of a WP include project planning document data in the development of an automobile, project participation member table data, requirement definition document data, specification definition document data, and product design figure data, and the like.

Here, it is assumed that a first operation stage has relevance to a second operation stage. For example, the first and the second operation stages have a relationship of an upstream stage and a downstream stage. Therefore, when a WP prepared at a first operation stage is changed, the WP prepared at the second operation stage may also change. For example, the WPs prepared at the first and the second operation stages have an input and output relationship or an inclusion relationship such as abstract information and detailed information.

At each operation stage, operation personnel often prepare a WP on the basis of trial and error, and change the WP through repeated revisions. Furthermore, a WP may be changed consequent to changes in the requirements or specification during development of the product, a bug occurring at the verification stage, a defect found in the product, or the like.

Since changes to another WP may be required consequent to changing a given WP, the range of any effect is identified by referring to the relationship between the WPs. In other words, it is important to maintain information identifying the relevance between the WPs in the system.

Thus, in the embodiment, each time when a WP in a given WPBOX is revised, association of the latest WP in a WPBOX associated with the given WPBOX having the revised WP is performed so that the operation load for associating the WPs can be reduced compared to manually associating the WPs. An example of the association procedure performed by the association apparatus 100 according to the embodiment will be described below.

(1) In FIG. 1, the association apparatus 100 detects that the new WP is stored in the WPBOX 101. "WP1_1.0" is stored as a new WP in the WPBOX 101. The "1.0" in "WP1_1.0" designates the revision number of "WP1".

(2) When the new WP is stored in the WPBOX 101, the association apparatus 100 identifies a WPBOX 102 associated with the WPBOX 101 by referring to a WPBOX relation table 110. The WPBOX relation table 110 is a memory unit configured to store relation information indicating the relevance between the WPBOX 101 and WPBOX 102.

(3) The association apparatus 100 creates relation information indicating the relevance between the new WP stored in the WPBOX 101 and the latest WP among the WPs that are stored in the WPBOX 102, and records the information into the WP relation table 120. The WP relation table 120 is a memory unit configured to store relation information indicating the relevance between WPs.

The latest WP that is stored in the WPBOX 102 has the latest revision number, "WP2_1.1". For this reason, relation information is created indicating the relevance between the "WP1_1.0" stored in the WPBOX 101 and "WP2_1.1" stored in the WPBOX 102, and is recorded into the WP relation table 120.

(4) The association apparatus 100 detects that a new WP is stored in the WPBOX 101. "WP1_1.1" is stored as a new WP in the WPBOX 101. (5) When the new WP is stored in the WPBOX 101, the association apparatus 100 identifies a WPBOX 102 associated with the WPBOX 101 by referring to the WPBOX relation table 110.

(6) The association apparatus 100 creates relation information indicating the relevance between the new WP stored in the WPBOX 101 and the latest WP among the WPs that are stored in the WPBOX 102, and records the information into the WP relation table 120. Here, relation information is created indicating the relevance between the "WP1_1.1" stored in the WPBOX 101 and "WP2_1.1" stored in the WPBOX 102, and is recorded to the WP relation table 120.

(7) The association apparatus 100 detects that a new WP is stored in the WPBOX 102. "WP2_1.2" is stored as a new WP in the WPBOX 102. (8) When the new WP is stored in the WPBOX 102, the association apparatus 100 identifies a WPBOX 101 associated with the WPBOX 102 by referring to the WPBOX relation table 110.

(9) The association apparatus 100 creates relation information indicating the relevance between the new WP stored in the WPBOX 102 and the latest WP among the WPs that are stored in the WPBOX 101, and records the information to the WP relation table 120. Here, relation information is created indicating the relevance between the "WP2_1.2" stored in the WPBOX 102 and "WP1_1.1" stored in the WPBOX 101, and is recorded in the WP relation table 120.

As described, according to this association method, each time when a WP in one of the associated WPBOXs 101, 102 is revised, association of the revised WP with the latest WP in the other WPBOX can be performed. Consequently, the manual operation load for associating the WPs when revising a WP can be reduced. Furthermore, since the association between WPs is performed automatically even when frequent revisions are performed on a WP, it is possible to prevent a mistake of forgetting to perform the association operation between WPs.

Figure 2:
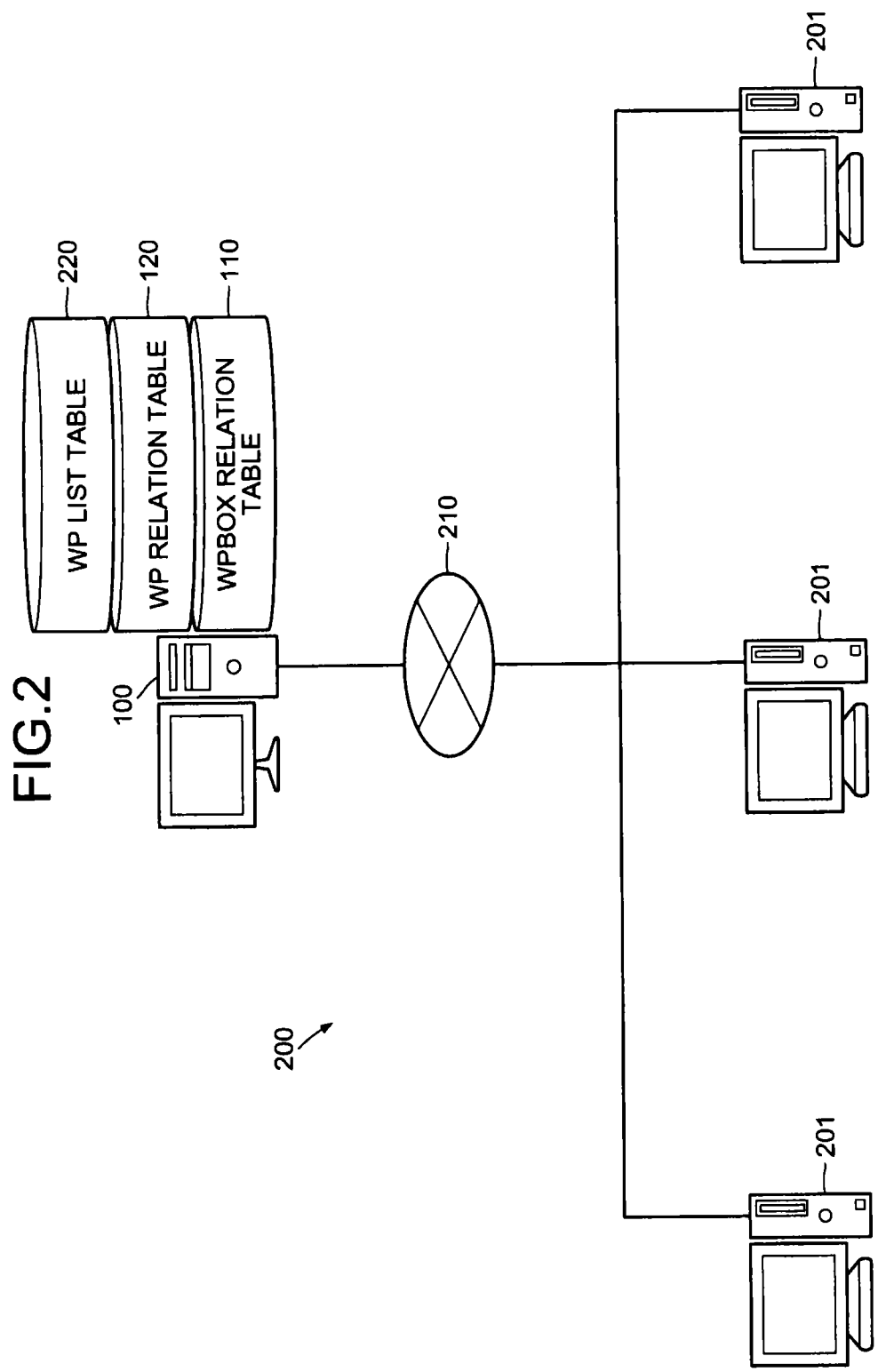
FIG. 2 depicts a system configuration example of a system 200.

Next, a system configuration example of a system 200 according to the embodiment will be described. FIG. 2 depicts a system configuration example of a system 200. In FIG. 2, the system 200 includes an association apparatus 100 and multiple client apparatuses 201 (three in the figure). In the system 200, the association apparatus 100 and the client apparatus 201 are connected via a cable or wireless network 210. The network 210 is for example the Internet, a local area network (LAN), a wide area network (WAN), or the like.

The association apparatus 100 is a computer that includes a WP list table 220 and executes integral management of the WPs prepared in each client apparatus 201. The association apparatus 100 includes the WPBOX relation table 110 and manages relation information indicating the relevance between WPBOXs. The association apparatus 100 includes the WP relation table 120 and manages relation information indicating the relevance between WPs. The various tables 110, 120, 220 will be described below in detail with reference to FIG. 4 to FIG. 6.

The client apparatus 201 is a personal computer or a notebook personal computer used by a user of the system 200. The user for example is a developer, designer, or approving party who participates in the automobile development project. The user, for example, can use the client apparatus 201 to prepare, change, and approve the WP.

A hardware configuration example of the association apparatus 100 and the client apparatuses 201 depicted in FIG. 2 will be described. In the description, the association apparatus 100 and the client apparatuses 201 are referred to as simply, "computer".

Figure 3:
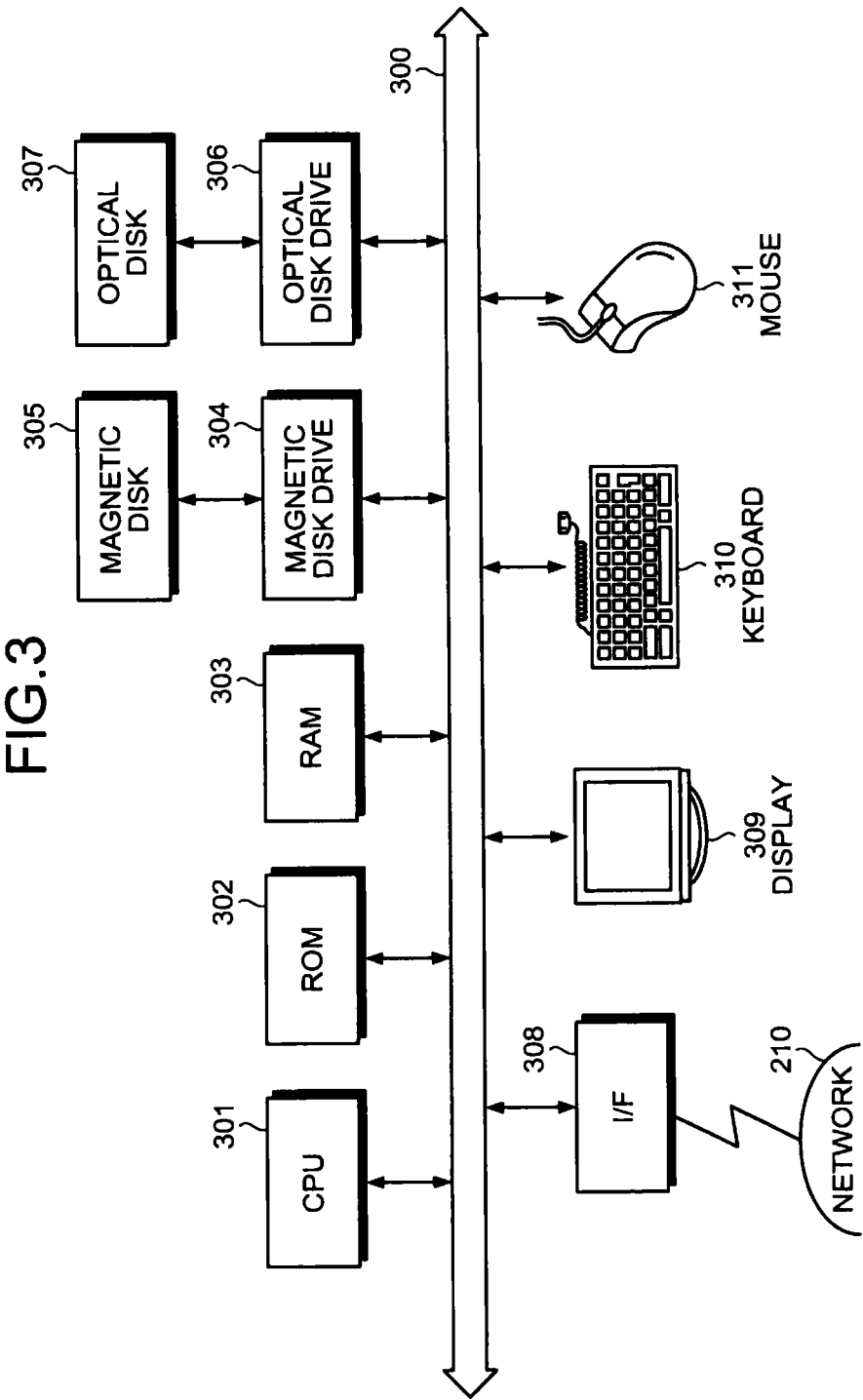
FIG. 3 is a block diagram of a hardware configuration of a computer according to the embodiment.

FIG. 3 is a block diagram of a hardware configuration of a computer according to the embodiment. As depicted in FIG. 3, the computer includes a central processing unit (CPU) 301, read-only memory (ROM) 302, random access memory (RAM) 303, a magnetic disk drive 304, a magnetic disk 305, an optical disk drive 306, an optical disk 307, an interface (I/F) 308, a display 309, a keyboard 310, and a mouse 311, respectively connected by a bus 300.

The CPU 301 governs overall control of the computer. The ROM 302 stores therein programs such as a boot program. The RAM 303 is used as a work area of the CPU 301. The magnetic disk drive 304, under the control of the CPU 301, controls the reading and writing of data with respect to the magnetic disk 305. The magnetic disk 305 stores therein data written under control of the magnetic disk drive 304.

The optical disk drive 306, under the control of the CPU 301, controls the reading and writing of data with respect to the optical disk 307. The optical disk 307 stores therein data written under control of the optical disk drive 306, the data being read by a computer.

The I/F 308 is connected to the network 210 such as a LAN, a WAN, and the Internet through a communication line and is connected to other apparatuses through the network 210. The I/F 308 administers an internal interface with the network 210 and controls the input/output of data from/to external apparatuses. For example, a modem or a LAN adaptor may be employed as the I/F 308.

The display 309 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 309.

The keyboard 310 includes, for example, keys for inputting letters, numerals, and various instructions and performs the input of data. Alternatively, a touch-panel-type input pad or numeric keypad, etc. may be adopted. The mouse 311 is used to move the cursor, select a region, or move and change the size of windows. A track ball or a joy stick may be adopted provided each respectively has a function similar to a pointing device.

Of the constituent portions described above, the association apparatus 100 does not necessarily include the optical disk drive 306, the optical disk 307, the display 309, the keyboard 310, the mouse 311, or the like.

Next, the details of the contents of the WP list table 220 will be described. The WP list table 220 for example is realized by a memory device such as the RAM 303, the magnetic disk 305, or the optical disk 307 of the association apparatus 100 as depicted in FIG. 3.

FIG. 4 depicts an example of the details of the contents of the WP list table 220. In FIG. 4, the WP list table 220 includes WPBOXID, WP name, revision, and approval flag fields. Information is entered into each field, thereby storing the WP list information (WP list information 400-1, 400-2) for each WPBOX as a record.

The WPBOXID is an identifier for the WPBOX. Each WPBOX for example is realized by a memory device such as the RAM 303, the magnetic disk 305, or the optical disk 307 of the association apparatus 100. The WP name is the name of the WP. The file name of the WP may be used for example as the name of the WP. The revision is the revision number of the WP. The approval flag is the flag that indicates whether the WP has already been approved. The approval flag has a value of "0" in an initial state. The approval flag changes from "0" to "1" when the WP is approved.

Taking the WP list information 400-1 as an example, for each WP indicated in the WPBOX 1, the WP name, the revision and an approval flag is indicated. For example, a revision "1.1" and approval flag "0" of the WP having a WP name "A_1.1.txt" are stored in the WPBOX 1. The contents of the WP list table 220 are updated each time a new WP is stored in a WPBOX.

The data structure of the WPBOX relation table 110 will be described. The WPBOX relation table 110 for example is implemented by a memory device such as the RAM 303, the magnetic disk 305, and the optical disk 307 of the association apparatus 100.

FIG. 5 depicts a data structure example of the WPBOX relation table 110. In FIG. 5, the WPBOX relation table 110 includes WPBOX relation ID, WPBOXID (parent), WPBOXID (child) and logical deletion flag fields. WPBOX relation information is stored as a record by entering information into each of the fields.

The WPBOX relation ID is the identifier for the relation between WPBOXs. The WPBOXID (parent) and WPBOXID (child) are the identifiers for the respective WPBOXs of two associated WPBOXs. The parent and child denote the distinction between the WPBOXIDs for associated WPBOXs. The logical deletion flag is a flag indicating whether a relation between WPBOXs has been deleted. The logical deletion flag has a value of "0" when in an initial state. The logical deletion flag changes from a value of "0" to a value of "1" when the relation between the WPBOXs is deleted. When the respective records can be uniquely identified by combination of the data in the WPBOXID (parent) and WPBOXID (child), data items of the WPBOX relation ID is not required in the table as an identifier for the WPBOX relation.

The data structure of the WP relation table 120 will be described. The WP relation table 120 for example is implemented by a memory device such as the RAM 303, the magnetic disk 305, and the optical disk 307 of the association apparatus 100.

Figure 6:
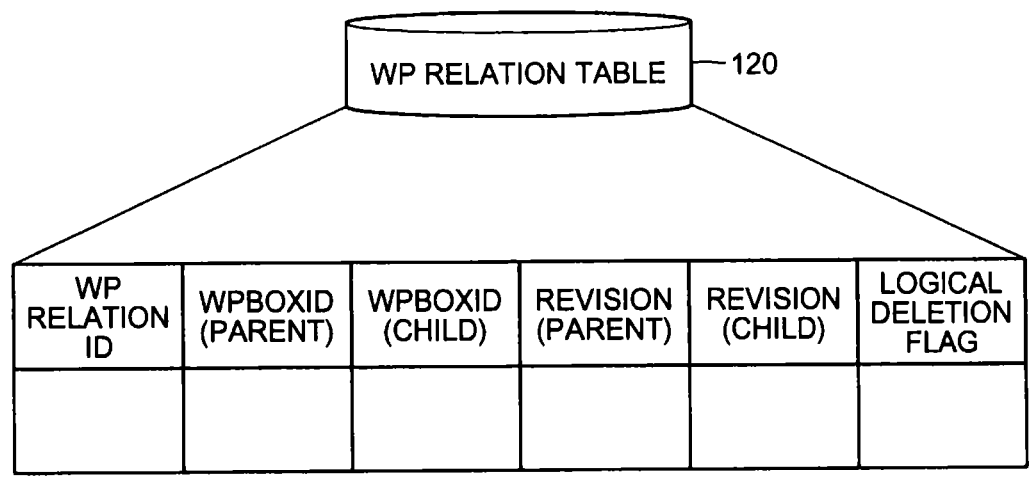
FIG. 6 depicts a data structure example of a WP relation table 120.

FIG. 6 depicts a data structure example of the WP relation table 120. In FIG. 6, the WP relation table 120 includes WP relation ID, WPBOXID (parent), WPBOXID (child), revision (parent), revision (child) and logical deletion flag fields. WPBOX relation information is stored as a record by setting information to each of the fields.

The WP relation ID is the identifier for the WP relation. The WPBOXID (parent) and WPBOXID (child) are the identifiers for the WPBOXs that store the respective WPs of two associated WPs. The revision (parent) is the revision number for a WP that is stored in the WPBOXID (parent) of two associated WPs. The revision (child) is the revision number for a WP that is stored in the WPBOXID (child) of two associated WPs. The logical deletion flag is a flag indicating whether a WPBOX relation has been deleted. When the respective records can be uniquely identified by a combination of the data in the WPBOXID (parent), WPBOXID (child), revision (parent), and revision (child), data items of the WP relation ID are not required in the table as an identifier of the WP relation. Furthermore, with respect to the WPBOX relation table 110 depicted in FIG. 5 and the WP relation table 120 depicted in FIG. 6, the data items stored in both tables are stored together in a single table.

Next, an example of a screen of the WPBOX list screen displayed on the display 309 of the client apparatus 201 will be described. The client apparatus 201 can display a WPBOX list screen on the display 309 by accessing the association apparatus 100 through the network 210. The screen information for the WPBOX list screen is stored in a memory device such as the RAM 303, the magnetic disk 305, and the optical disk 307 of the association apparatus 100.

Figure 7:
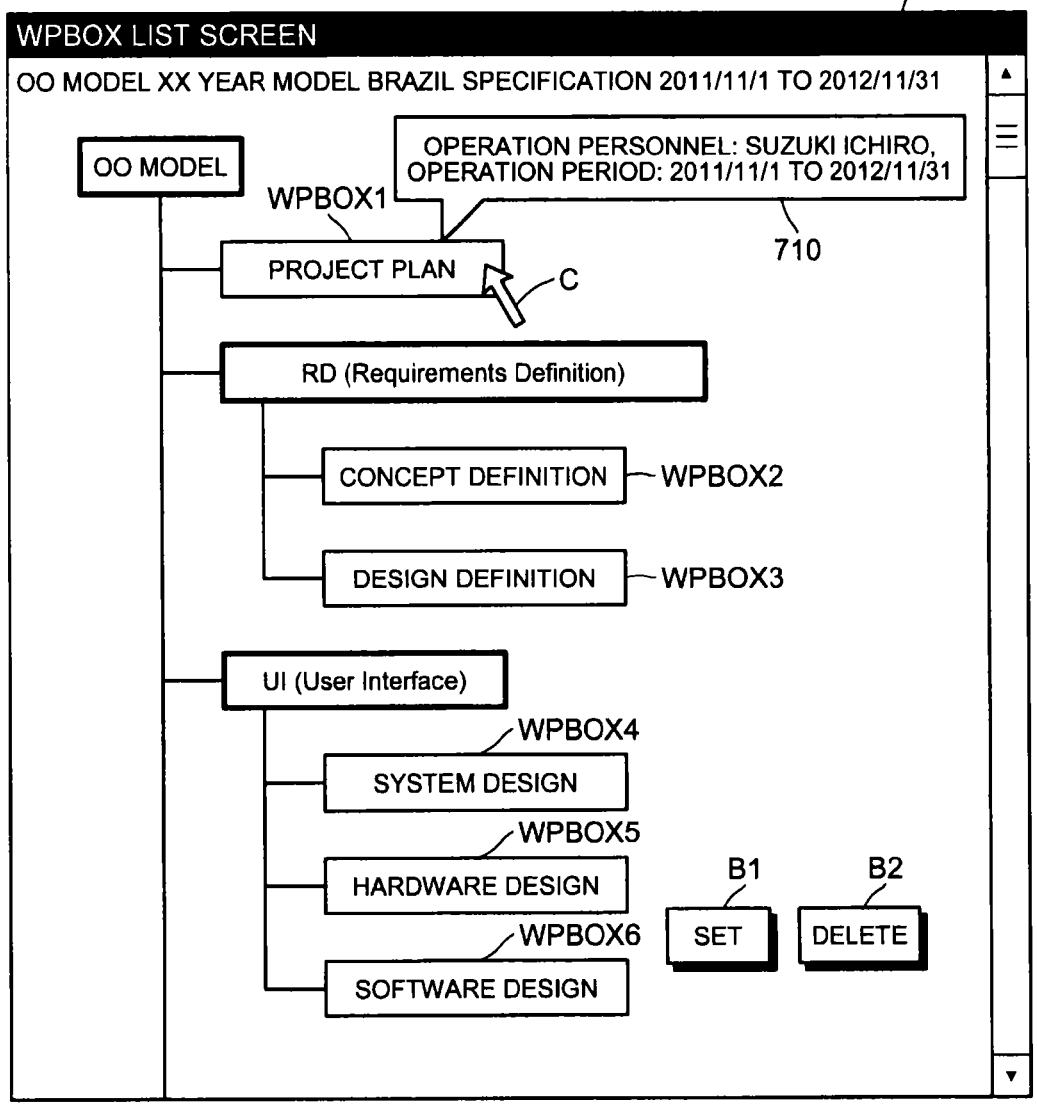
FIGS. 7, 8, and 9 depict an example of a screen of a WPBOX list screen.
Figure 8:
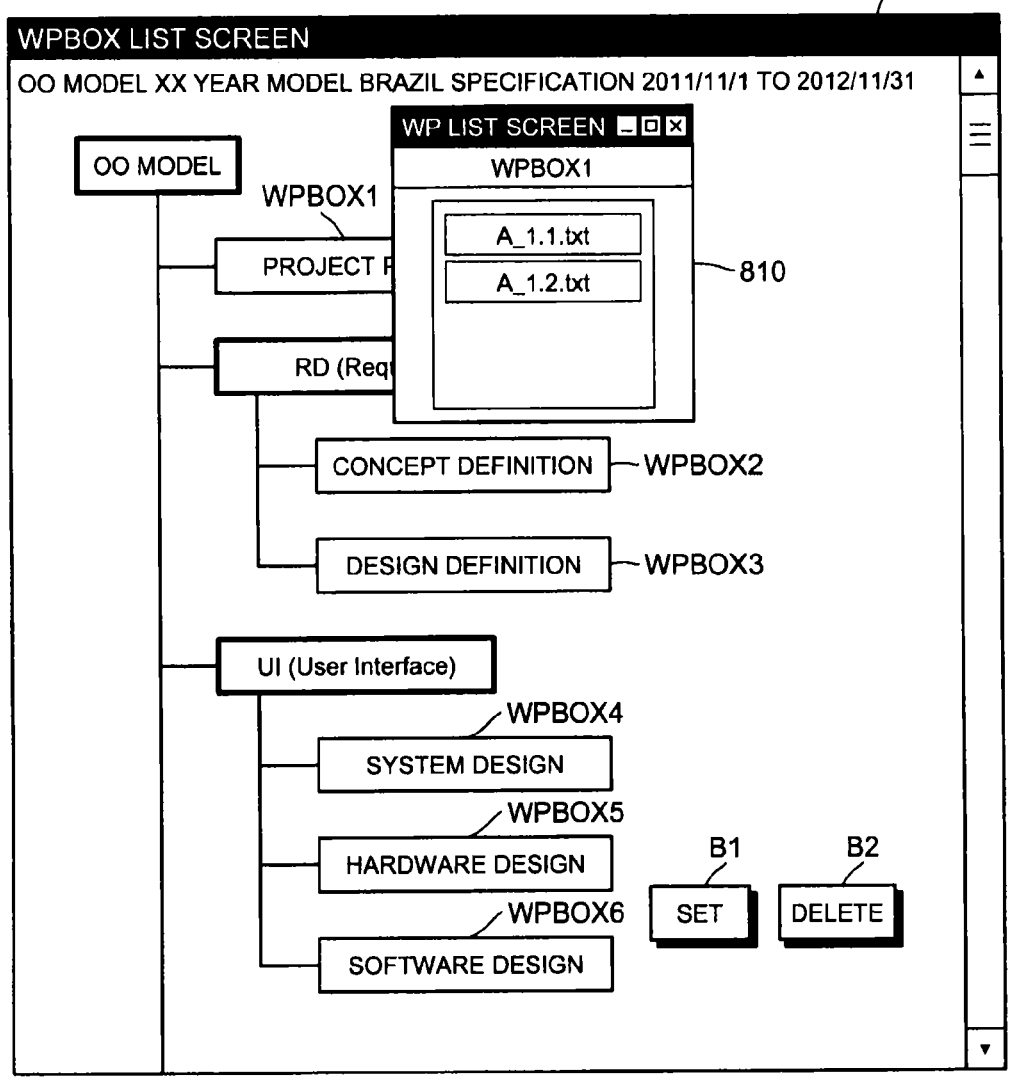
Figure 9:
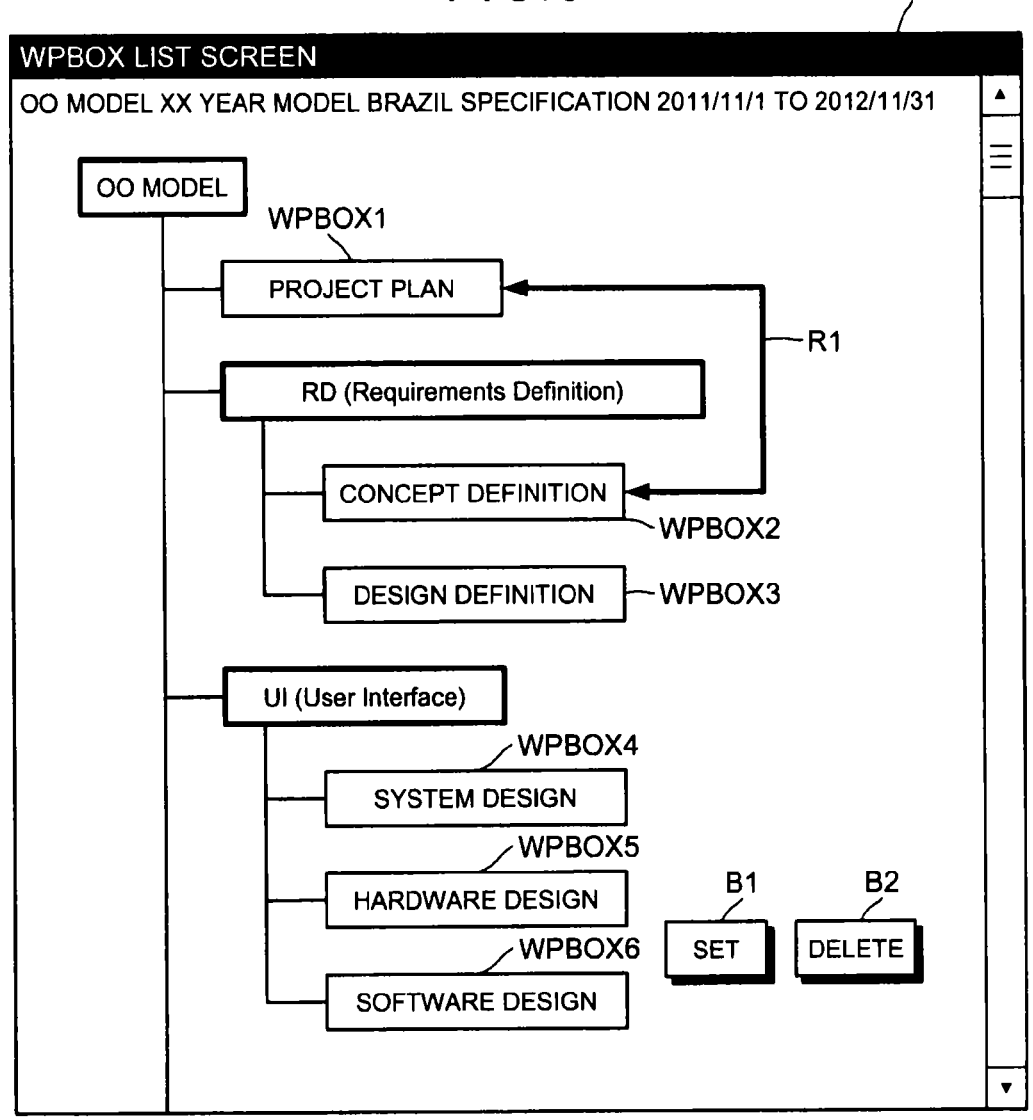

FIGS. 7, 8, and 9 depict an example of a screen of the WPBOX list screen. In FIG. 7, a WPBOX list screen 700 is a screen configured to display a WPBOX (for example, WPBOX 1 to WPBOX 6) that corresponds to each operation stage of the operation stages related to automobile development. The WPBOX list screen 700 displays "2011/11/1 to 2012/11/31" as the development period and "OO model xx year model Brazil specification" as the development automobile model.

In the WPBOX list screen 700, operation information is displayed as a pop-up when the cursor C is aligned with any of the WPBOXs by an operation input of a user using the mouse 311 or the keyboard 310 of the client apparatus 201. The operation information indicates the operation personnel and the operation period of each operation stage. The method of displaying operation information is not limited to the use of a pop-up display.

In the example depicted in FIG. 7, the operation information 710 is displayed as pop-up, indicating an operation period of "2011/11/1 to 2012/11/31" and operation personnel as "Suzuki Ichiro" when the cursor C is aligned with the WPBOX 1. The operation information 710 enables confirmation of the operation personnel and the operation period in the project planning stage.

In the WPBOX list screen 700, a WP list screen is displayed in order to display the WP stored in the WPBOX by moving the cursor C and double clicking any of the WPBOXs. The WPBOX list screen may also be displayed by a single click.

In the example depicted in FIG. 8, as a result of double clicking of the WPBOX 1, the WP list screen 810 displaying the WP stored in the WPBOX 1 is displayed as pop-up. The WP list screen 810 enables confirmation of the WP that is stored in the WPBOX 1. From the WP list screen 810, a WP that is to be changed or viewed can be selected, or a new WP can be created and stored in the WPBOX 1. When a new WP is stored in the WPBOX 1, for example, the WP list information 400-1 of the WP list table 220 depicted in FIG. 4 is updated.

In the WPBOX list screen 700, a WPBOX relation can be set by moving the cursor C and double clicking the button B1. For example, for example, a relation can be set between WPBOXs by clicking the two associated WPBOXs after clicking the button B1. Setting of a relation between WPBOXs may also be performed by a clicking of the button B1 after specification of the two associated WPBOXs is input from the user.

In the example depicted in FIG. 9, as a result of a clicking of WPBOX 1 and WPBOX 2, a relation R1 between WPBOX 1 and WPBOX 2 is set. Thereafter, since the arrow that indicates the relation R1 in the WPBOX list screen 700 is displayed, the user can confirm that the relation R1 is set between WPBOX 1 and WPBOX 2.

The setting result of the WPBOX relation is sent, for example, from the client apparatus 201 to the association apparatus 100. The setting result includes the respective WPBOXIDs of the two WPBOXs set in the relation.

In the WPBOX list screen 700, the WPBOX relation can be deleted by moving the cursor C and clicking the button B2. For example, the WPBOX relation can be deleted by clicking the two WPBOXs set in the relation after clicking the button B2.

The deletion result of the WPBOX relation, for example, is sent from the client apparatus 201 to the association apparatus 100. The deletion result includes the respective WPBOXIDs of the two WPBOXs for which the relation is deleted.

Figure 10:
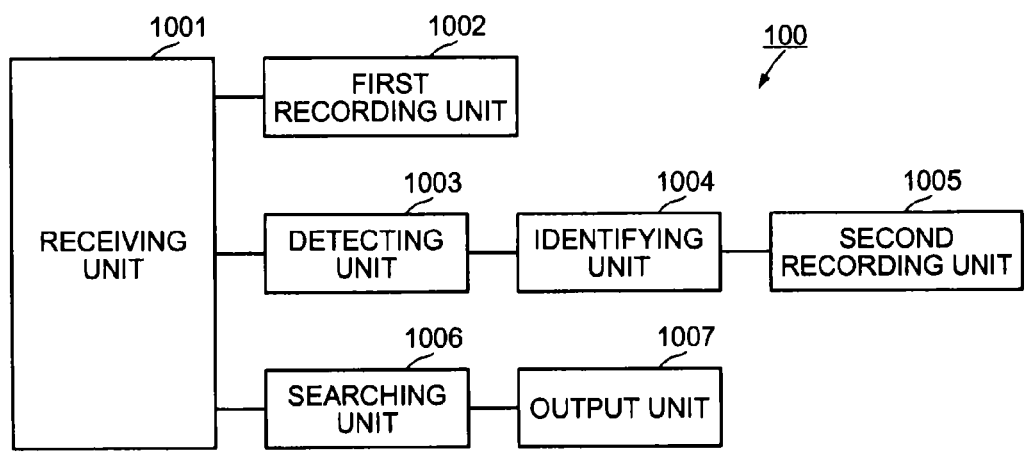
FIG. 10 is a block diagram depicting an example of a functional structure of an association apparatus 100.

FIG. 10 is a block diagram depicting an example of a functional structure of the association apparatus 100. In FIG. 10, the association apparatus 100 includes a receiving unit 1001, a first recording unit 1002, a detecting unit 1003, an identifying unit 1004, a second recording unit 1005, a searching unit 1006, and an output unit 1007. The units from the receiving unit 1001 to the output unit 1007 serve as a control unit. For example, for example, these functions are realized by an execution by the CPU 301 of a program stored in a memory device such as the ROM 302, the RAM 303, the magnetic disk 305, the optical disk 307 of the association apparatus 100, or by an I/F 308. Furthermore, the processing result of each functional unit, for example, is stored in a memory device such as the RAM 303, the magnetic disk 305, and the optical disk 307.

The receiving unit 1001 has a function of receiving an operation input to associate the first WPBOX with the second WPBOX. Here, the WPBOX is a memory space corresponding to any of the plurality of operation stages related to the design or manufacture of the object of development, and is the storage location of the WP prepared at that operation stage.

For example, the receiving unit 1001 may receive an operation input to associate the first WPBOX with the second WPBOX by receiving the setting result of the relation between WPBOXs from the client apparatus 201. Furthermore, the receiving unit 1001, for example, may receive an operation input to associate the first WPBOX with the second WPBOX by receiving an operation input from the user via the mouse 311 or the keyboard 310 of the association apparatus 100.

The first recording unit 1002 has a function of creating relation information indicating the relevance between the first WPBOX and the second WPBOX when the operation input to associate the first WPBOX and the second WPBOX is received. Furthermore, the first recording unit 1002 has a function of recording the generated relation information in the WPBOX relation table 110.

For example, the first recording unit 1002 records the relation information as a new record by entering information into each field of the WPBOX relation table 110 by referring to the setting result of the WPBOX relation. An example of recording the relation into the WPBOX relation table 110 will be described below with reference to FIG. 13.

The detecting unit 1003 has a function of detecting that a new WP has been stored in the first WPBOX. For example, the detecting unit 1003 may detect that a new WP has been stored in the first WPBOX by receiving a storage result from the client apparatus 201, indicating that a new WP has been stored in the first WPBOX. Furthermore, the detecting unit 1003 may directly detect that a new WP has been stored in the first WPBOX.

When a new WP is stored in the first WPBOX, for example, the contents in the WP list table 220 depicted in FIG. 4 are updated. For example, a WP name, relation and approval flag for the new WP are entered into each field of the WP list information corresponding to the WPBOXID of the first WPBOX.

The identifying unit 1004 has a function of identifying the second WPBOX that is associated with the first WPBOX, by referring to the WPBOX relation table 110 when a new WP is stored in the first WPBOX. For example, the identifying unit 1004 first searches the WPBOX relation table 110, for relation information corresponding to the first WPBOX. For example, the identifying unit 1004 searches the WPBOX relation table 110, for relation information in which the WPBOXID of the first WPBOX is set in the field for WPBOXID (parent) or WPBOXID (child).

The identifying unit 1004 identifies a WPBOXID that is different from the WPBOXID of the first WPBOX, among the retrieved WPBOXIDs that are set in the field for WPBOXID (parent) or WPBOXID (child). In this manner, the second WPBOX associated with the first WPBOX can be identified.

The second recording unit 1005 has a function of creating relation information indicating the relevance between the new WP stored in the first WPBOX and the latest WP among the WPs that are stored in the identified second WPBOX. The second recording unit 1005 has a function of recording the generated relation information in the WP relation table 120.

The latest WP among the WPs that are stored in the WPBOX is for example the WP with the latest revision number or storage date in the WPBOX. For example, the second recording unit 1005 records the relation information as a new record by entering the information into respective fields of the WP relation table 120. An example of recording relation information into the WP relation table 120 will be described below making reference to FIG. 14 and FIG. 16.

The receiving unit 1001 has a function of receiving the approval result for the new WP that is stored in the first WPBOX. As used herein, approval is the acknowledgment that the details of the WP are suitable. The approval of the WP for example is performed by a superior of the creator of the WP.

For example, the receiving unit 1001 may receive the approval result of the new WP from the client apparatus 201. Furthermore, the receiving unit 1001 may receive the approval result for the new WP by an operation input by a user via the mouse 311 or the keyboard 310 of the association apparatus 100.

For example, the contents of the WP list table 220 are updated when a new WP stored in the first WPBOX is approved. For example, the approval flag of the new WP stored in the first WPBOX is updated from "0" to "1".

The detecting unit 1003 has a function of detecting that the new WP stored in the first WPBOX has been approved. For example, for example, the detecting unit 1003 may detect that the new WP has been approved when an approval result is received that indicates that the new WP has been approved.

The identifying unit 1004 may identify the second WPBOX associated with the first WPBOX by referring to the WPBOX relation table 110 when a new WP stored in the first WPBOX is approved. Thus, the second WPBOX associated with the first WPBOX can be identified when the WP stored in the first WPBOX is approved.

The second recording unit 1005 may create relation information indicating the relevance between the new approved WP that is stored in the first WPBOX and the latest and approved WP among WPs stored in the second WPBOX. Thus, the relation information for the approved WPs can be recorded in the WP relation table 120.

The identifying unit 1004 may identify the second WPBOX associated with the first WPBOX when the relation information indicating the relevance between the first WPBOX and the second WPBOX is recorded in the WPBOX relation table 100.

The second recording unit 1005 may create relation information indicating the relevance between the latest WP among the WPs that are stored in the first WPBOX and the latest WP among the WPs that are stored in the second WPBOX. Thus, the relation information between the latest WPs can be recorded in the WP relation table 120 when the relation between the first WPBOX and the second WPBOX is set. The latest WP that is stored in each WPBOX can be identified from the WP list table 220 for example.

The second recording unit 1005 may create relation information indicating the relevance between the latest and approved WP among the WPs that are stored in the first WPBOX and the latest and approved WP among the WPs that are stored in the second WPBOX. Thus, the relation information between the latest and approved WPs can be recorded in the WP relation table 120 when the relation between the first WPBOX and the second WPBOX is set. The latest and approved WP that is stored in each WPBOX can be identified from the WP list table 220 for example.

The receiving unit 1001 has a function of receiving an operation input designating any of the WPs stored in the first WPBOX. The designated WP for example is a WP for which details are changed during development, a WP in which a bug has occurred in the verification stage, or a WP thought to be a cause a defect that has been identified in a product after manufacture.

The method of designating the WP is arbitrary. For example, a user may designate a specific WP that is stored in the first WPBOX, or may designate all WPs in the first WPBOX by designating a WPBOXID. Furthermore, a user may designate a creator of a WP so as to designate the WP prepared by the creator.

For example, the receiving unit 1001 may receive an operation input designating any of one of the WPs in the first WPBOX by an operation input of a user via the mouse 311 or the keyboard 310 of the association apparatus 100. Furthermore, the receiving unit 1001 may receive the input result of the operation input for designating any of the WPs in the first WPBOX from the client apparatus 201.

The searching unit 1006 has a function of searching for other WPs associated with the designated WP by referring to the WP relation table 120 when the operation input designating a WP in the first WPBOX is received. In the following description, the designated WP may be denoted as the "WP under test".

For example, the searching unit 1006 searches the WP relation table 120 for information indicating relations with WPs corresponding to an WP under test. For example, the searching unit 1006 retrieves relation information in which the WPBOXID of the first WPBOX is set to the WPBOXID (parent) field and the revision of the WP under test is set to the revision (parent). Then, the searching unit 1006 identifies the WPBOX of the WPBOXID that is set to the WPBOXID (child) field of the retrieved relation information. The searching unit 1006 may identify the WP of the revision that is set to the revision (child) field of the retrieved relation information, among the WPs that are stored in a identified WPBOX as another WP that is associated with the WP under test. In this manner, other WPs that are associated with the WP under test can be retrieved.

The searching unit 1006 may search the WP relation table 120 for relation information in which the WPBOXID of the first WPBOX is set to the WPBOXID (child) field and the revision of the WP under test is set to the revision (child). In this case, the searching unit 1006 identifies the WPBOX of the WPBOXID that is set to the WPBOXID (parent) of the retrieved relation information. The searching unit 1006 may identify as another WP that is associated with the WP under test, the WP of a revision that is set to the revision (parent) of the retrieved relation information, among the WPs that are stored in the identified WPBOX.

The searching unit 1006 may use a retrieved WP as the WP under test and refer to the WP relation table 120, so as to search for another WP that is associated with the WP under test. In this manner, it is possible to search for a WP that is directly or indirectly associated with the initially designated WP under test.

The searching unit 1006 may repeat the search for other WPs that are associated with the WP under test based on a preset searching level L. As used herein, the searching level L determines the degree of searching for a WP that is directly or indirectly associated with the initially designated WP under test. The searching level L for example is stored in a memory device of the association apparatus 100.

For example, when "L=1", the searching unit 1006 finishes the searching process after searching for a WP that is associated with the initially designated WP under test. Furthermore, for example, when "L=2", the searching unit 1006 retrieves a WP that is associated with the initially designated WP under test, and then ends the searching process after searching for a WP that is associated with the retrieved WP as the WP under test.

The same WP may be included in duplicate in the search results. In this case, the searching unit 1006 may delete a duplicate WP from the search results.

The output unit 1007 has a function of outputting the search results. For example, the output unit 1007 may output a search result list in which the WP under test and WPs that are directly or indirectly associated with the WP under test are listed. An example of a search results list will be described below with reference to FIG. 18.

The form of output by the output unit 1007 may be, for example, display on the display 309, print output to a printer (not depicted), or transmission to the client apparatus 201 via the I/F 308. Furthermore, data may be stored to a memory device such as the RAM 303, the magnetic disk 305, and the optical disk 307.

The receiving unit 1001 may receive an operation input to delete the association between the first WPBOX and the second WPBOX. For example, the receiving unit 1001 may receive the operation input to delete the association between the first WPBOX and the second WPBOX by receiving a deletion result for the WPBOX relation from the client apparatus 201. The receiving unit 1001 may receive the operation input to delete the association between the first WPBOX and the second WPBOX by receiving an operation input from a user via the mouse 311 or the keyboard 310 of the association apparatus 100.

When an operation input for deleting the association between the first WPBOX and the second WPBOX is received, the first recording unit 1002 may delete relation information indicating the relevance between the first WPBOX and the second WPBOX. For example, the first recording unit 1002 may change the logical deletion flag for the relation information that indicates the relevance between the first WPBOX and the second WPBOX in the WPBOX relation table 110 from a value of "0" to "1".

In this manner, even when the association between the first WPBOX and the second WPBOX is deleted, the relation information is not deleted from the WPBOX relation table 110, and a trace of the setting of the association between the first WPBOX and the second WPBOX remains. In other words, after deleting the WPBOX association, WPs can be associated based on relation information indicating the relevance with the WPBOX.

When an operation input for deleting the association between the first WPBOX and the second WPBOX is received, the second recording unit 1005 may delete relation information indicating the relevance between WPs based on the association between the first WPBOX and the second WPBOX.

For example, the second recording unit 1005 searches the WP relation table 110 for relation information in which respective WPBOXIDs are set for the first and the second WPBOX. Then, the second recording unit 1005 may change the logical deletion flag of the searched relation information from a value of "0" to "1".

In this manner, even when the association between the first WPBOX and the second WPBOX is deleted, the relation information is not deleted from the WP relation table 120, and a trace of the setting of the association between WPs remains. In other words, even after deleting the WPBOX association, another WP that is associated with the WP under test can be searched for based on relation information indicating the relevance between WPs.

Next, an example of a setting of relations between WPBOXs and between WPs will be described using an example of the WPBOX 1 and WPBOX 2. In the following description, the term "WPk (k=1, 2, . . . ) is an identifier for a WP used in the description in the present specification.

FIGS. 11A, 11B, 11C, 12A, 12B, and 12C depict a first example of setting of relations between WPBOXs and between WPs. In the figures, a WP denoted by a mark M designates an approved WP.

Figure 11A:
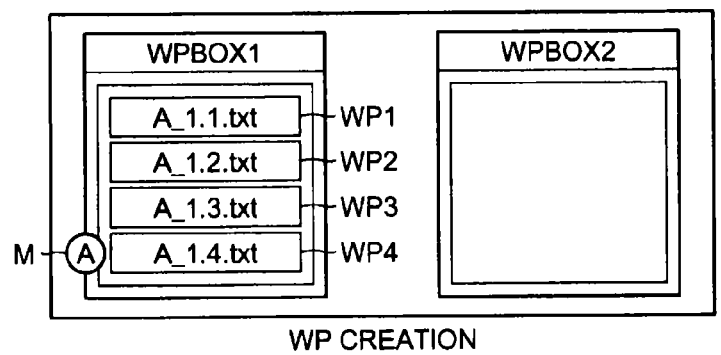

In FIG. 11A, a new WP4 is created and stored in the WPBOX 1. WP4 denotes the approved WP of the WP name "A__1.4.txt" and revision "1.4". At this point in time, since the relation between the WPBOXs is not set, the relation between WPs is not set.

Figure 11B:
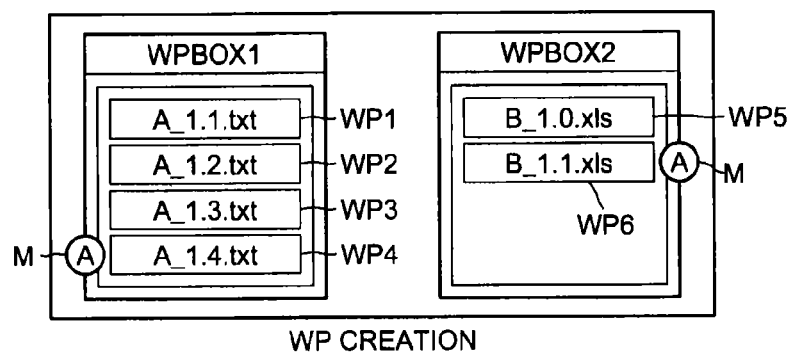

In FIG. 11B, a new WP6 is created and stored in the WPBOX 2. WP6 denotes the approved WP of the WP name "B__1.1.xls" and revision "1.1". At this point in time, since the relation between the WPBOXs is not set, the relation between WPs is not set.

Figure 11C:
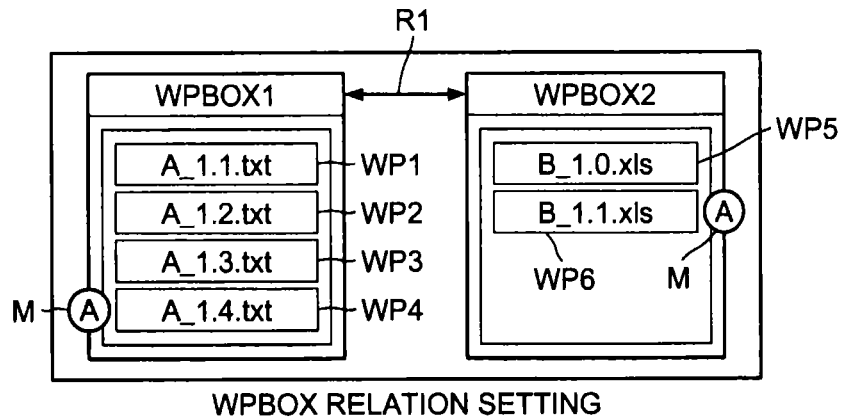

In FIG. 11C, the relation R1 between the WPBOX 1 and WPBOX 2 is set. As a result, relation information indicating the relevance between the WPBOX 1 and WPBOX 2 is recorded in the WPBOX relation table 110 by the first recording unit 1002 (reference is made below to FIG. 13B).

Figure 12A:
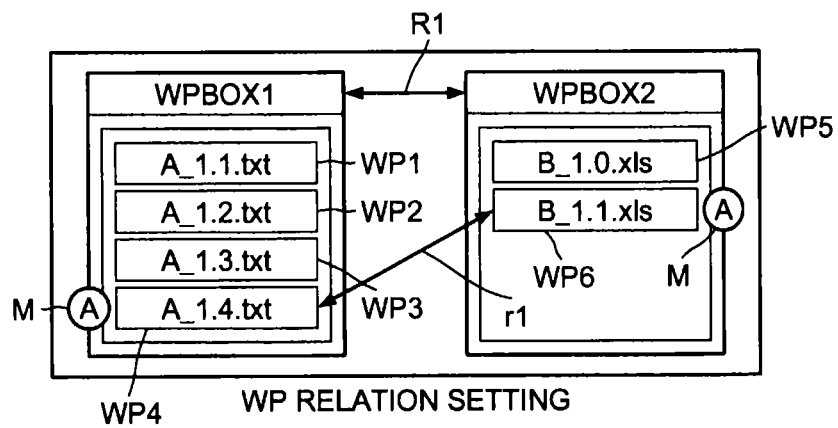

In FIG. 12A, since the relation R1 between the WPBOX 1 and WPBOX 2 is set, the relation r1 between WP4 stored in the WPBOX 1 and WP6 stored in the WPBOX 2 is set. WP4 is the latest and approved WP among WP1 to WP4 stored in the WPBOX 1. WP6 is the latest and approved WP among WP5 and WP6 stored in the WPBOX 2. Consequently, relation information indicating the relevance between WP4 and WP6 is created by the second recording unit 1005 and recorded to the WP relation table 120 (reference is made below to FIG. 14B).

Figure 12B:
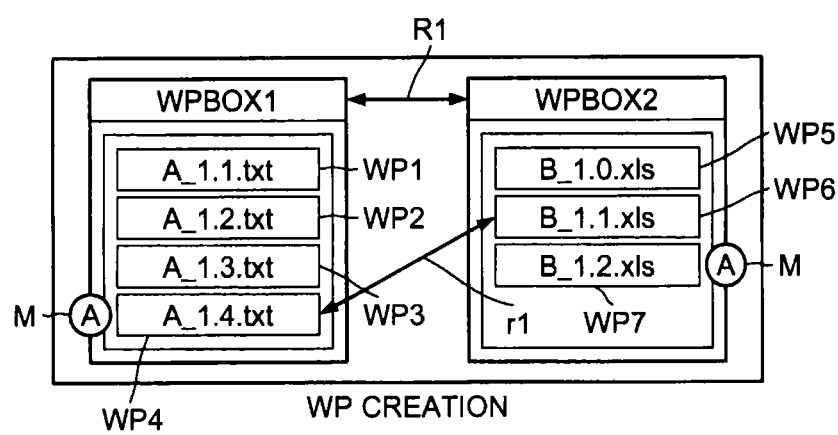

In FIG. 12B, a new WP7 is created and WP7 is stored in the WPBOX 2. WP7 is the approved WP of the WP name "B__1.2.xls" and revision "1.2".

In FIG. 12C, since WP7 stored in WPBOX 2 has been approved, the relation r2 between WP4 stored in the WPBOX 1 and WP7 stored in the WPBOX 2 is set. WP4 is the latest and approved WP among WP1 to WP4 stored in the WPBOX 1. WP7 is the latest and approved WP among WP5 and WP7 stored in the WPBOX 2. Consequently, relation information indicating the relevance between WP4 and WP7 is created by the second recording unit 1005 and recorded in the WP relation table 120 (reference is made below to FIG. 14C).

Using FIGS. 13A and 13B, an example of the transition of the contents in the WPBOX relation table 110 in response to the first example of setting will be described. FIGS. 13A and 13B depict an example of the transition of the contents in the WPBOX relation table 110.

In FIG. 13A, relation information is not stored in the WPBOX relation table 110. As described in FIG. 11C, a setting of a relation R1 between WPBOX 1 and WPBOX 2 is assumed.

In FIG. 13B, when the relation R1 between WPBOX 1 and WPBOX 2 is set, information is set to each field in the WPBOX relation table 110, and the relation information 1300-1 is stored as a new record. For example, "R1" is set in the WPBOX relation ID field, "WPBOX 1" is set to the WPBOX 1 (parent) field, "WPBOX 2" is set to the WPBOXID (child) field, and a value of "0" is set to the logical deletion flag.

FIGS. 14A, 14B, and 14C are diagrams depicting an example of the transition of the contents in the WP relation table 120.

In FIG. 14A, relation information is not stored in the WP relation table 120. As described in FIG. 12A, a setting of a relation r1 between WP4 and WP6 is assumed.

In FIG. 14B, when the relation r1 between WP4 and WP6 is set, information is set to each respective field in the WP relation table 120, and the relation information 1400-1 is stored as a new record. For example, "r1" is set in the WP relation ID field, "WPBOX 1" is set to the WPBOX 1 (parent) field, "WPBOX 2" is set to the WPBOXID (child) field, "1.4" is set to the revision (parent) field, "1.1" is set to the revision (child) field, and a value of "0" is set to the logical deletion flag.

As described in FIG. 12C, a setting of a relation r2 between WP4 and WP7 is here assumed.

In FIG. 14C, when the relation r2 between WP7 and WP6 is set, information is set to each respective field in the WP relation table 120, and the relation information 1400-2 is stored as a new record. For example, "r2" is set in the WP relation ID field, "WPBOX 1" is set to the WPBOX 1 (parent) field, "WPBOX 2" is set to the WPBOXID (child) field, "1.4" is set to the revision (parent) field, "1.2" is set to the revision (child) field, and a value of "0" is set to the logical deletion flag.

When relation information 1400-2 is recorded in the WP relation table 120, the second recording unit 1005 may delete the relation information 1400-1 from the WP relation table 120. The relation information 1400-1 has the same combination of the WPBOXID (parent) and WPBOXID (child) as the newly recorded relation information 1400-2. In this manner, configuration can be such that only the latest relation information that indicates the relevance between WPs is retained in the WP relation table 120.

FIGS. 15A, 15B, 15C, and 15D depict a second example of setting of relations between WPBOXs and between WPs.

Figure 15A:
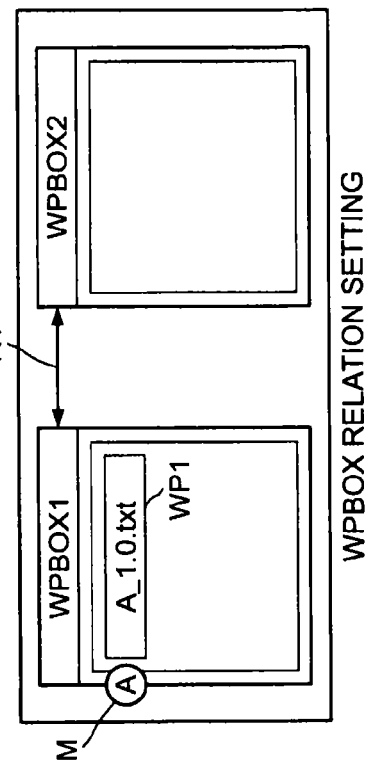
FIGS. 15A, 15B, 15C, and 15D depict a second example of setting of relations between WPBOXs and between WPs.

In FIG. 15A, a new WP1 is created and stored in the WPBOX 1. WP1 denotes the approved WP of the WP name "A_1.0.txt" and revision "1.0". At this point in time, since the relation between the WPBOXs is not set, the relation between WPs is not set.

Figure 15B:
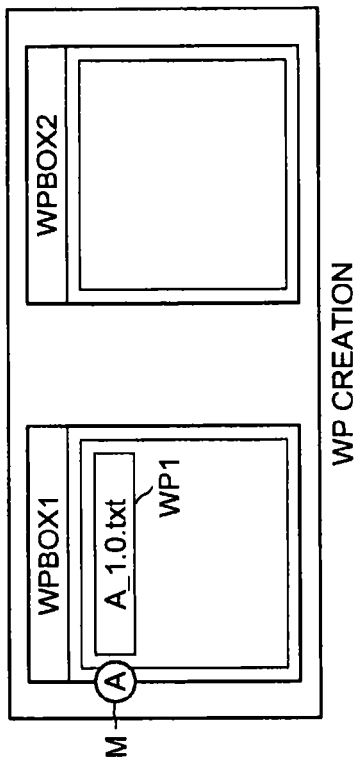

In FIG. 15B, the relation R1 between WPBOX 1 and WPBOX 2 is set. Consequently, the relation information indicating the relevance between WPBOX 1 and WPBOX 2 is recorded to the WPBOX relation table 110. At this point in time, since no WP is stored in the WPBOX 2, the WP relation is not set.

Figure 15C:
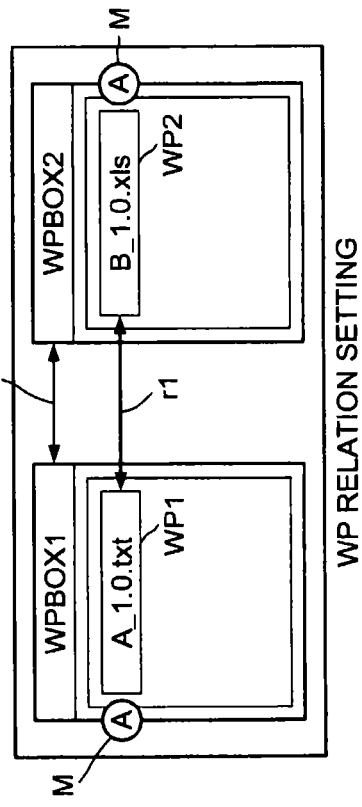

In FIG. 15C, a new WP2 is created and stored in the WPBOX 2. WP2 denotes the not-approved WP of the WP name "B_1.0.xls" and revision "1.0". At this point in time, since WP2 stored in WPBOX 2 is not approved, the relation between WPs is not set.

Figure 15D:
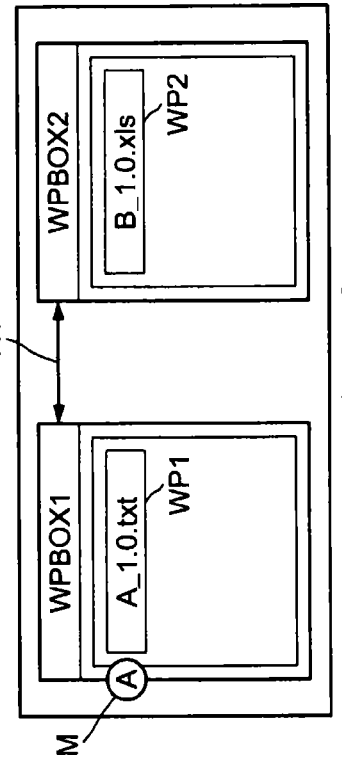

In FIG. 15D, since WP2 stored in WPBOX 2 is approved, the relation r1 between WP1 stored in WPBOX 1 and WP2 stored in WPBOX 2 is set. Consequently, the relation information indicating the relevance between WP1 and WP2 is recorded to the WP relation table 120 by the second recording unit 1005 (reference is made below to FIG. 16B).

Using FIG. 16A, 16B, an example of the transition of the contents in the WP relation table 120 in response to the second example of setting will be described. Description concerning the transition of the contents in the WP relation table 120 in response to the second example of setting is the same as the description concerning the transition in response to the first example of setting, and will be omitted.

FIGS. 16A and 16B are diagrams depicting an example of the transition of the contents in the WP relation table 120. In FIG. 16S, relation information is not stored in the WP relation table 120. As depicted in FIG. 15D, the setting of a relation r1 between WP1 and WP2 is here assumed.

In FIG. 16B, when the relation r1 between WP1 and WP2 is set, information is set to each respective field in the WP relation table 120, and the relation information 1600-1 is stored as a new record. For example, "r1" is set in the WP relation ID field, "WPBOX 1" is set to the WPBOX 1 (parent) field, "WPBOX 2" is set to the WPBOXID (child) field, "1.0" is set to the revision (parent) field, "1.02" is set to the revision (child) field, and a value of "0" is set to the logical deletion flag.

FIGS. 17A, 17B, 17C, and 17D depict a third example of setting of a WPBOX and WP relation.

Figure 17B:
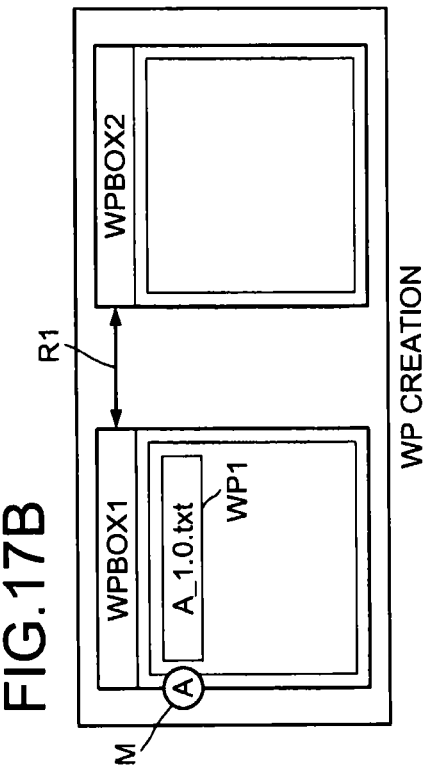
FIGS. 17A, 17B, 17C, and 17D depict a third example of setting of a WPBOX and WP relation.
Figure 17D:
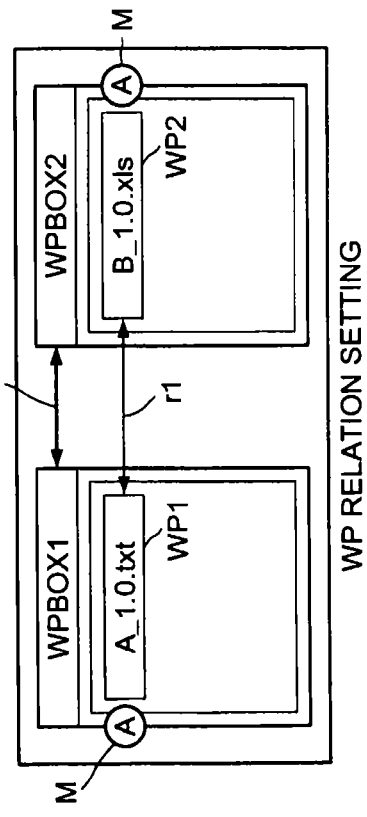
Figure 17A:
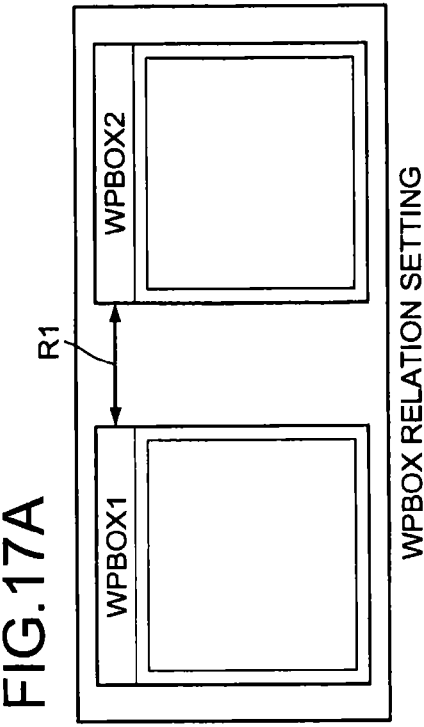

In FIG. 17A, a relation R1 between WPBOX 1 and WPBOX 2 is set. As a result, relation information indicating the relevance between the WPBOX 1 and WPBOX 2 is recorded to the WPBOX relation table 110 by the first recording unit 1002. At this point in time, since no WP is stored in WPBOX 1 and 2, the WP relation is not set.

In FIG. 17B, a new WP1 is created and stored in the WPBOX 1. WP1 is the approved WP of the WP name "A_1.0.txt" and revision "1.0". At this point in time, since no WP is stored in WPBOX 2, the WP relation is not set.

Figure 17C:
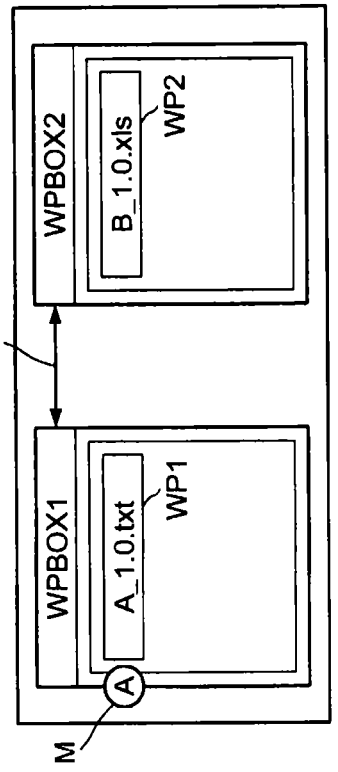

In FIG. 17C, a new WP2 is created and stored in the WPBOX 2. WP2 is the not-approved WP of the WP name "B_1.0.xls" and revision "1.0". At this point in time, since WP2 stored in WPBOX 2 is not approved, the WP relation is not set.

In FIG. 17D, since WP2 stored in WPBOX 2 is approved, the relation r1 between WP1 stored in WPBOX 1 and WP2 stored in WPBOX 2 is set. Consequently, the relation information indicating the relevance between WP1 and WP2 is recorded in the WP relation table 120 by the second recording unit 1005.

Description concerning the transition of the contents in the WPBOX relation table 110 in response to the third example of setting is the same as the description concerning the transition in response to the first example of setting, and will be omitted. Also, description concerning the transition of the contents in the WP relation table 120 in response to the third example of setting is the same as the description concerning the transition in response to the second example of setting, and will be omitted.

In this manner, when the WPBOX relation is set, relation information indicating the relevance between WPBOXs is recorded in the WPBOX relation table 110. Furthermore, when the WP relation is set, relation information indicating the relevance between WPs is recorded in the WP relation table 120.

Next, an example of a search results list that forms a list of the WPs directly or indirectly associated with the WP under test will be described. An example will be described in which WP4 depicted in FIG. 12C is designated as the WP under test to thereby describe a configuration in which another WP that is associated with the WP under test is retrieved based on the contents in the WP relation table 120 depicted in FIG. 14C.

Figure 18:
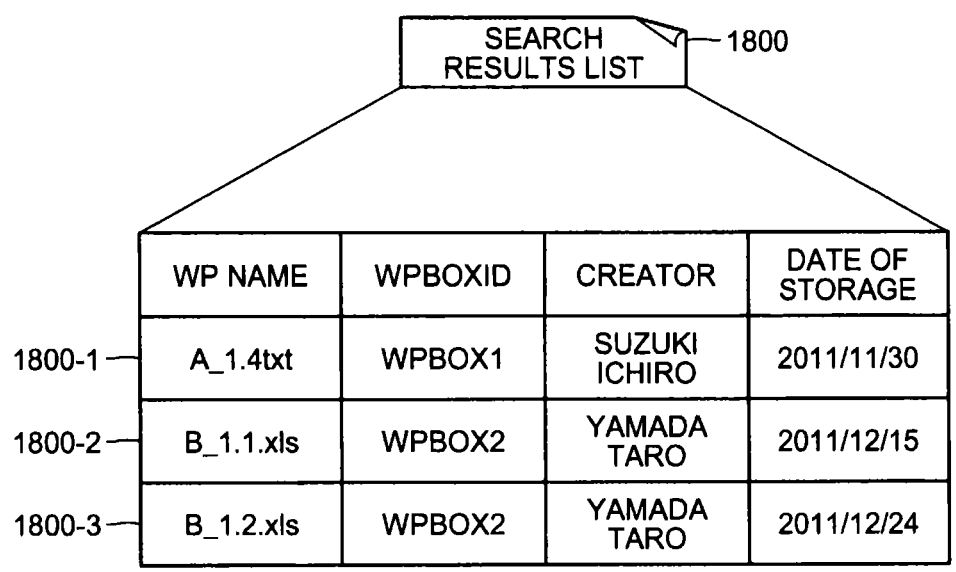
FIG. 18 depicts an example of a search results list.

FIG. 18 depicts an example of the search results list. In FIG. 18, search results 1800-1 to 1800-3 indicating the WP name, WPBOXID, the creator, and date of storage are indicated in the search results list 1800.

The WP name is the name of the WP. The WPBOXID is the identifier for the WPBOX that stores the WP. The creator is the name of the WP creator. The date of storage is the date of storage of the WP to the WPBOX. The date of storage may be the date of final updating of the WP, or may be the date at which the WP was approved. Data items related to the creator or the date of storage are not necessarily required.

The search result 1800-1 is information related to WP4 that is designated as the WP under test (refer to FIGS. 12A to 12C). For example, WP name "A_1.4.txt", WPBOXID "WPBOX 1", a creator as "Suzuki Ichiro", and a storage date of "2011/11/30" are indicated.

The search results 1800-2 are information related to WP6 that is related to WP4, which is designated as the WP under test (refer to FIGS. 12A to 12C). For example, WP name "B_1.1.xls", WPBOXID "WPBOX 2", a creator as "Yamada Taro", and a storage date of "2011/12/15" are indicated.

The search results 1800-3 are information related to WP7 that is related to WP4, which is designated as the WP under test (refer to FIGS. 12A to 12C). For example, WP name "B_1.2.xls", WPBOXID "WPBOX 2", a creator as "Yamada Taro", and a storage date of "2011/12/24" are indicated.

According to the search results list 1800, the WP name, the WPBOXID, the creator and the storage date can be identified for WP4 that is designated as the WP under test. Furthermore, according to the search results list 1800, the WP name, the WPBOXID, the creator and the storage date can be identified for WP6, WP7 that are associated with WP4, which is designated as the WP under test.

In this manner, the WP name, the WPBOXID, the creator and the storage date can be identified for WP6, WP7 that may be affected by a change to the details of WP4.

Next, a sequence of the respective processing steps of the association apparatus 100 will be described. Firstly, a first association processing sequence for recording relation information indicating the relevance between WPs when the latest WP stored in the first WPBOX 1 is approved will be described.

Figure 19:
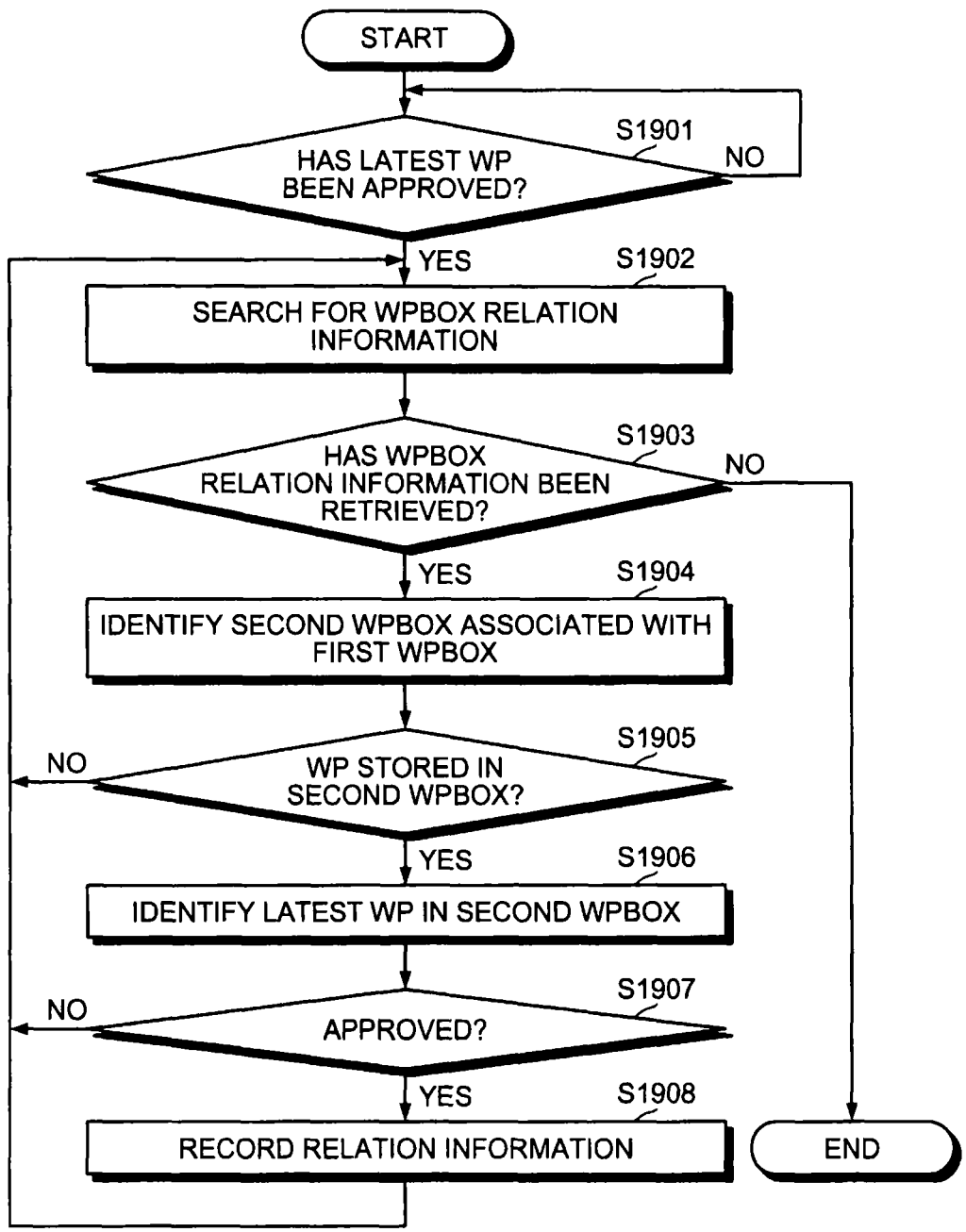
FIG. 19 is a flowchart depicting an example of the first association processing sequence of the association apparatus 100.

FIG. 19 is a flowchart depicting an example of the first association processing sequence of the association apparatus 100. In the flowchart in FIG. 19, firstly the identifying unit 1004 determines whether the latest WP among the WP stored in the first WPBOX has been approved (step S1901).

The identifying unit 1004 waits for approval of the latest WP (step S1901: NO). When the latest WP is approved (step S1901: YES), the identifying unit 1004 searches the WPBOX relation table 110 for WPBOX relation information corresponding to the first WPBOX (step S1902).

Next, the identifying unit 1004 determines whether WPBOX relation information corresponding to the first WPBOX has been retrieved (step S1903). If the relation information has been retrieved (step S1903: YES), the identifying unit 1004 identifies the second WPBOX associated with the first WPBOX by referring to the retrieved relation information (step S1904).

Then, the second recording unit 1005 determines whether a WP is stored in the identified second WPBOX (step S1905). If no WP is stored in the second WPBOX (step S1905: NO), the processing returns to step S1902. On the other hand, if a WP is stored in the second WPBOX (step S1905: YES), the second recording unit 1005 identifies the latest WP among the WPs that are stored in the second WPBOX (step S1906).

The second recording unit 1005 determines whether the latest WP has been approved (step S1907). If the latest WP has not been approved (step S1907: NO), the processing returns to step S1902.

On the other hand, if the latest WP has been approved (step S1907: YES), the second recording unit 1005 creates WP relation information and records the relation information into the WP relation table 120 (step S1908), and the processing returns to step S1902. The relation information indicates the relevance between the latest approved WP stored in the first WPBOX and the latest approved WP stored in the second WPBOX.

At step S1903, if WP relation information corresponding to the first WPBOX is not retrieved (step S1903: NO), the series of processing steps in the flowchart is terminated.

In this manner, when the latest WP stored in the first WPBOX is approved, at that time, the latest approved WP can be associated with the latest approved WP stored in the second WPBOX.

Although an example has been described in which relation information indicating the relevance between WPs is recorded when the latest WP stored in the first WPBOX is approved, configuration is not limited hereto. For example, relation information indicating the relevance between WPs may be recorded when the latest WP is stored in the first WPBOX. Alternatively, relation information indicating the relevance between WPs may be recorded when any of the WPs stored in the first WPBOX is approved.

Next, a second association processing sequence for recording relation information indicating the relevance between WPs when the WPBOX relation is set will be described.

Figure 20:
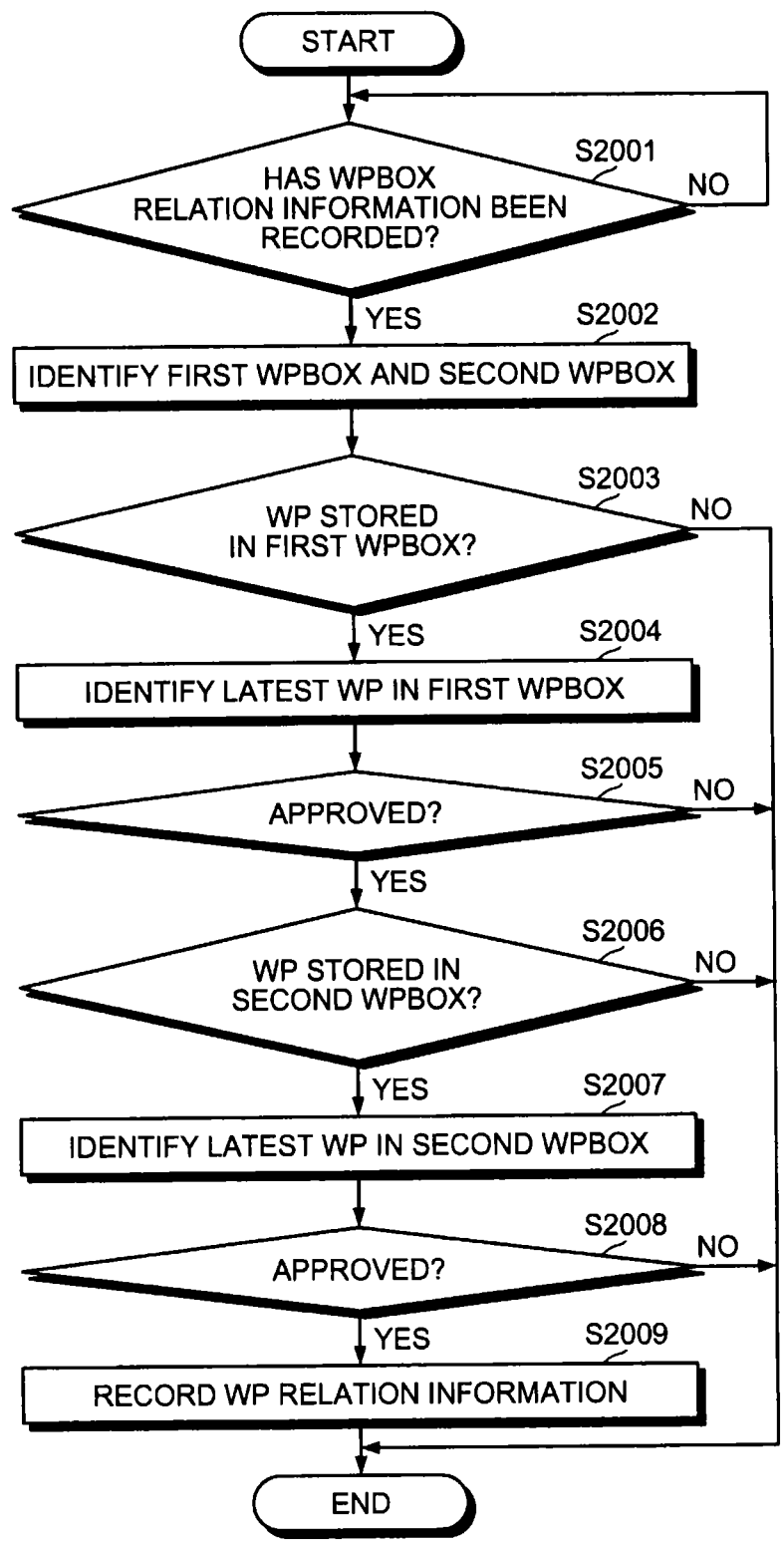
FIG. 20 is a flowchart depicting an example of a second association processing sequence of the association apparatus 100.

FIG. 20 is a flowchart depicting an example of the second association processing sequence of the association apparatus 100. In the flowchart depicted in FIG. 20, the identifying unit 1004 determines whether WPBOX relation information has been recorded in the WPBOX relation table 110 (step S2001).

The identifying unit 1004 waits for recording of WPBOX relation information (step S2001: NO). When WPBOX relation information has been recorded (step S2001: YES), the identifying unit 1004 identifies the associated first WPBOX and second WPBOX by referring to the recorded relation information (step S2002).

Next, the second recording unit 1005 determines whether a WP has been stored in the identified first WPBOX (step S2003). If no WP has been stored in the identified first WPBOX (step S2003: NO), the series of processing steps in the flowchart is terminated.

On the other hand, if a WP is stored in the identified first WPBOX (step S2003: YES), the second recording unit 1005 identifies the latest WP among the WPs stored in the first WPBOX (step S2004). The second recording unit 1005 determines whether the latest WP has been approved (step S2005). If the latest WP has not been approved (step S2005: NO), the series of processing steps in the flowchart is terminated.

On the other hand, if the latest WP has been approved (step S2005: YES), the second recording unit 1005 determines whether a WP is stored in the identified second WPBOX (step S2006). If no WP is stored in the identified second WPBOX (step S2006: NO), the series of processing steps in the flowchart is terminated.

On the other hand, if a WP is stored in the second WPBOX (step S2006: YES), the second recording unit 1005 identifies the latest WP among the WPs stored in the second WPBOX (step S2007). The second recording unit 1005 determines whether the latest WP has been approved (step S2008). If the latest WP has not been approved (step S2008: NO), the series of processing steps in the flowchart is terminated.

On the other hand, if the latest WP has been approved (step S2008: YES), the second recording unit 1005 creates and records into the WP relation table 120, WP relation information (step S2009), and the series of processing steps in the flowchart is terminated. This relation information indicates the relevance between the latest approved WP stored in the first WPBOX and the latest approved WP stored in the second WPBOX.

In this manner, when the WPBOX relation is set, the latest WP stored in one associated WPBOX can be associated with the latest WP stored in another WPBOX.

Next, the searching process sequence for searching for another WP that is related to the WP under test will be described.

Figure 21:
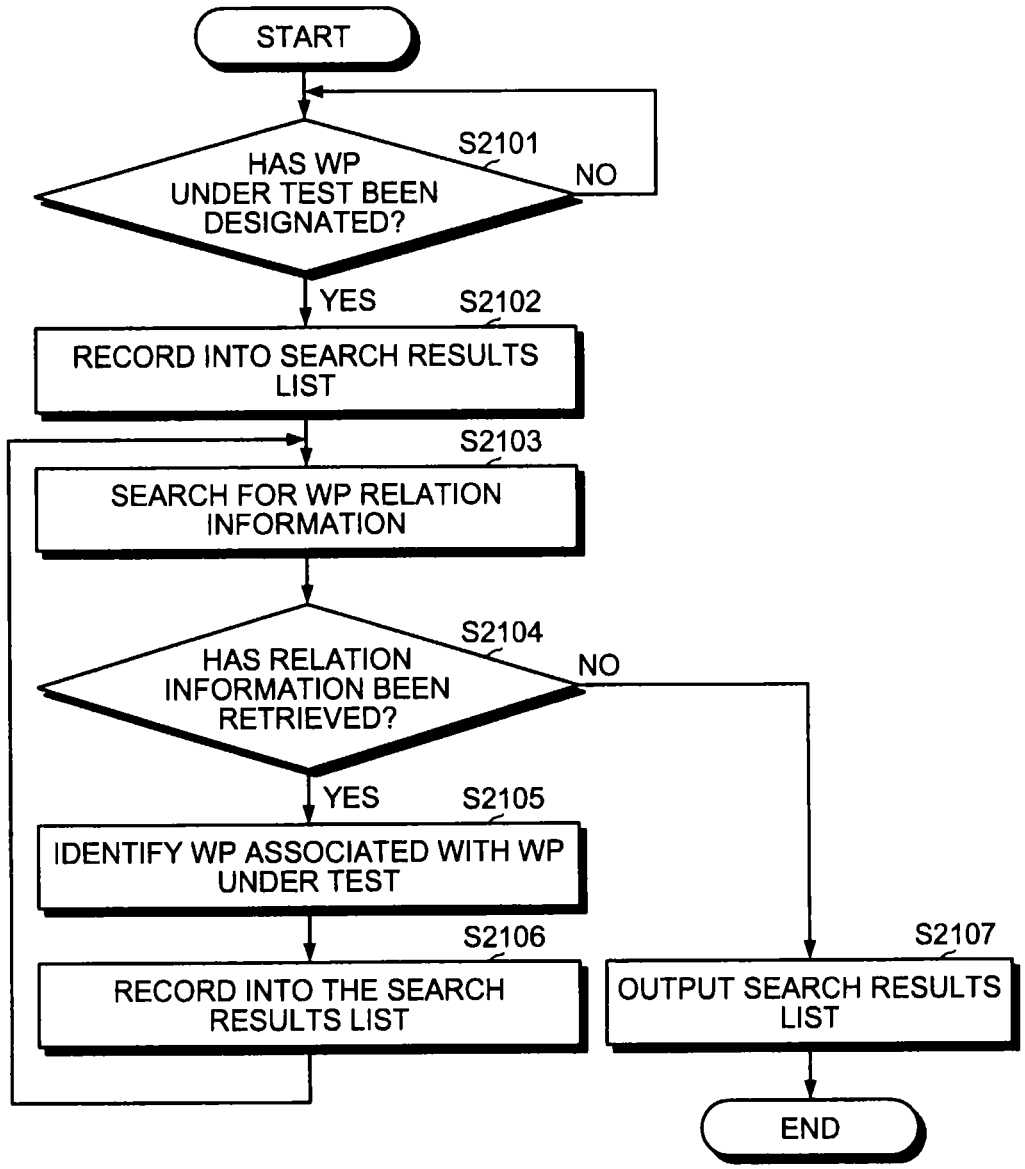
FIG. 21 is a flowchart depicting an example of a searching process sequence of the association apparatus 100.

FIG. 21 is a flowchart depicting an example of the searching process sequence of the association apparatus 100. Firstly, the searching unit 1006 determines whether the WP under test has been designated (step S2101). The searching unit 1006 waits for the WP under test to be designated (step S2101: NO).

When the WP under test has been designated (step S2101: YES), the searching unit 1006 records the designated WP under test to the search results list (step S2102). Next, the searching unit 1006 searches the WP relation table 120 for WP relation information corresponding to the WP under test (step S2103).

Then, the searching unit 1006 determines whether relation information has been retrieved (step S2104). If relation information has been retrieved (step S2104: YES), a WP that is associated with the WP under test is identified by referring to the retrieved relation information (step S2105).

The searching unit 1006 records the identified WP into the search results list (step S2106), and the processing returns to step S2103. At step S2104: NO), the output unit 1007 outputs a search results list (step S2107), and the series of processing steps in the flowchart is terminated.

In this manner, another WP that is associated with the WP under test can be retrieved, and a search results list can be output in which the retrieved WPs are listed.

When multiple WPs under test are identified, the series of processes at step S2101 to 2107 described above may be repeated for each WP under test by the searching unit 1006. Furthermore, when the searching level L (2≤L) is set, a WP identified at step S2105 may be regarded as the WP under test according to the searching level L, and the series of processes at step S2101 to 2107 described above may be repeated recursively.

As described above, according to the association apparatus 100 in the embodiment, when a new WP is stored in the first WPBOX, the second WPBOX associated with the first WPBOX can be identified by referring to the WPBOX relation table 110. Furthermore, according to the association apparatus 100, relation information indicating the relevance between the new WP stored in the first WPBOX and the latest WP of the WPs stored in the second WPBOX can be created and recorded in the WP relation table 120. The latest WP for example is the WP with the latest revision number or storage date of the WPs stored in the WPBOX.

In this manner, each time when the new WP is stored in the first WPBOX, the new WP can be associated with the latest WP stored in the second WPBOX. As a result, the operation load for manually associating WPs during a WP revision can be reduced. Furthermore, overlooking of the association between WPs can be prevented since, after setting the relation between the first and the second WPBOXs, the association between WPs is automatically performed by the association apparatus 100.

According to the association apparatus 100, when an operation input for association of the first WPBOX and the second WPBOX is received, relation information indicating the association of the first WPBOX and the second WPBOX is created and recorded to the WPBOX relation table 110. In this manner, a WPBOX relation can be set arbitrarily.

According to the association apparatus 100, when the latest WP stored in the first WPBOX is approved, the second WPBOX that is associated with the first WPBOX can be identified by referring to the WPBOX relation table 110. Further, according to the association apparatus 100, relation information indicating the association of the latest approved WP stored in the first WPBOX and the latest approved WP stored in the second WPBOX is created and recorded to the WP relation table 120.

In this manner, when the latest WP stored in the first WPBOX is approved, at that time, the approved WP can be associated with the latest approved WP stored in the second WPBOX. As a result, the operation load to manually associate WPs during a WP revision can be reduced.

According to the association apparatus 100, each time when the WPBOX relation information is recorded in the WPBOX relation table 110, the associated first WPBOX and second WPBOX can be identified by referring to the relation information. Furthermore, according to the association apparatus 100, relation information indicating the relevance between the latest approved WP stored in the first WPBOX and the latest and approved WP stored in the second WPBOX can be created and recorded in the WP relation table 120.

In this manner, when the WPBOX relation is set, the latest approved WP stored in one associated WPBOX can be associated with the latest approved WP stored in another WPBOX. As a result, the operation load to manually associate WPs during WPBOX relation setting can be reduced.

According to the association apparatus 100, when an operation input is received to delete the association between the first WPBOX and the second WPBOX, the relation information indicating the relevance between the first WPBOX and the second WPBOX can be deleted from the WPBOX relation table 110. In this manner, the setting of the WPBOX relation can be deleted.

According to the association apparatus 100, when an operation input for designating the WP under test is received, a WP associated with the WP under test can be retrieved by referring to the WP relation table 120, and the search results of the search can be outputted. In this manner, when there is a change to the details of the WP under test, it is possible to identify another WP that may be affected by the change to the details of the WP under test.

According to the association apparatus 100, a WP associated with the WP under test may be designated as the WP under test according to a preset searching level L, and the series of processes for searching for other related WPs may be repeated recursively. In this manner, it is possible to search for WPs that are directly or indirectly associated with the initially designated WP under test. For example, a relationship between WPs that are prepared at respective operation stages can be tracked across two or more operation stages during automobile development.

The association method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A nontransitory computer-readable recording medium storing a program that causes a computer to execute an association process comprising:
   identifying a second storage location associated with a first storage location by referring to a memory configured to store storage location association information indicating relevance between the first storage location and the second storage location where second data prepared at a second operation stage associated with a first operation stage and fourth data obtained by changing content of the second data are stored, the second storage location being identified when new data stored in the first storage location, where first data prepared at the first operation stage among a plurality of stages for manufacture of a product and third data obtained by changing content of the first data are stored, is approved;
   identifying latest data stored in the identified second storage location, and determining the latest data identified has been approved; and
   creating and recording in the memory, data association information indicating the relevance between the new data stored in the first storage location and the latest data among the data that is stored in the second storage location when the latest data has been approved.

2. The nontransitory computer-readable recording medium according to claim 1, the process comprising:
   receiving an operation input for designating any of the data in the first storage location; and
   searching for data associated with the designated data, when the operation input for designating any of the data is received and based on the data association information; and
   outputting search results.

3. The nontransitory computer-readable recording medium according to claim 1, wherein
   the latest data is the data with the latest revision number or storage date among the data that is stored in the second storage location.

4. The nontransitory computer-readable recording medium according to claim 1, the process comprising:
   receiving an operation input for deleting association between the first storage location and the second storage location; and
   deleting from the memory when the operation input is received, the storage location association information indicating the relevance between the first storage location and the second storage location.

5. The nontransitory computer-readable recording medium according to claim 1, the process comprising:
   receiving an operation input for association of the first storage location and the second storage location; and
   creating and recording in the memory when the operation input is received, storage location association information indicating the relevance between the first storage location and the second storage location.

6. The nontransitory computer-readable recording medium according to claim 5, wherein
   the identifying includes identifying the associated first storage location and second storage location by referring to the storage location association information, when the storage location association information is recorded in the memory, and
   the creating and recording includes creating and recording in the memory, the data association information indicating the relevance between latest data among the data stored in the first storage location and the latest data among the data that is stored in the second storage location.

7. The nontransitory computer-readable recording medium according to claim 6, wherein
   the creating and recording includes creating and recording in the memory, the data association information indicating the relevance between latest approved data among the data stored in the first storage location and latest approved data among the data that is stored in the second storage location.

8. An association method executed by a computer, the association method comprising:
   identifying a second storage location associated with a first storage location by referring to a memory configured to store storage location association information indicating relevance between the first storage location and the second storage location where second data prepared at a second operation stage associated with a first operation stage and fourth data obtained by changing content of the second data are stored, the second storage location being identified when new data stored in the first storage location, where first data prepared at the first operation stage among a plurality of stages for manufacture of a product and third data obtained by changing content of the first data are stored, is approved;
   identifying latest data stored in the identified second storage location, and determining the latest data identified has been approved; and
   creating and recording in the memory, data association information indicating the relevance between the new data stored in the first storage location and the latest data among the data that is stored in the second storage location when the latest data has been approved.

9. An association apparatus comprising:
   a memory to store storage location association information indicating relevance between a first storage location where data prepared at a first operation stage among a plurality of stages for manufacture of a product is stored and a second storage location where second data prepared at a second operation stage associated with the first operation stage and fourth data obtained by changing content of the second data are stored; and
   a processor configured to:

identify the second storage location associated with the first storage location by referring to the memory when new data stored in the first storage location is approved, identify latest data stored in the identified second storage location, and determine the latest data identified has been approved; and create and record to the memory, data association information indicating the relevance between the new data stored in the first storage location and the latest data among the data that is stored in the second storage location when the latest data has been approved.

\* \* \* \* \*